(12) United States Patent
Paul

(10) Patent No.: US 10,144,905 B2
(45) Date of Patent: Dec. 4, 2018

(54) COMPOSITION AND PROCESS OF MAKING AN AMINO SILICONE BASED DELAYED ANTIFOAM FOR USE IN LAUNDRY DETERGENT

(71) Applicant: WACKER METROARK CHEMICALS PVT. LTD., Kolkata (IN)

(72) Inventor: Amit Kumar Paul, Kolkata (IN)

(73) Assignee: WACKER METROARK CHEMICALS PVT. LTD., Kolkata (IN)

( * ) Notice: Subject to any disclaimer, the term of this patent is extended or adjusted under 35 U.S.C. 154(b) by 27 days.

(21) Appl. No.: 15/314,590

(22) PCT Filed: Aug. 27, 2014

(86) PCT No.: PCT/IN2014/000548
§ 371 (c)(1),
(2) Date: Dec. 6, 2016

(87) PCT Pub. No.: WO2016/001934
PCT Pub. Date: Jan. 7, 2016

(65) Prior Publication Data
US 2017/0198239 A1    Jul. 13, 2017

(30) Foreign Application Priority Data
Jun. 30, 2014 (IN) .............................. 708/KOL/2014

(51) Int. Cl.
| C11D 3/00 | (2006.01) |
| B01D 19/04 | (2006.01) |
| C11D 3/04 | (2006.01) |
| C11D 3/10 | (2006.01) |
| C11D 3/22 | (2006.01) |
| C11D 3/37 | (2006.01) |
| C11D 7/10 | (2006.01) |
| C11D 7/12 | (2006.01) |
| C11D 7/26 | (2006.01) |
| C11D 11/00 | (2006.01) |

(52) U.S. Cl.
CPC ........ C11D 3/0026 (2013.01); B01D 19/0409 (2013.01); B01D 19/0413 (2013.01); C11D 3/046 (2013.01); C11D 3/10 (2013.01); C11D 3/222 (2013.01); C11D 3/3742 (2013.01); C11D 7/10 (2013.01); C11D 7/12 (2013.01); C11D 7/268 (2013.01); C11D 11/0017 (2013.01)

(58) Field of Classification Search
CPC .............. C11D 3/0026; C11D 19/0409; C11D 19/0413; C11D 3/046; C11D 3/10
See application file for complete search history.

(56) References Cited

U.S. PATENT DOCUMENTS

| 4,584,125 A | | 4/1986 | Griswold | |
| 5,045,225 A | * | 9/1991 | Aronson | ............ B01D 19/0409 510/303 |
| 9,387,417 B2 | * | 7/2016 | Merget | ............... B01D 19/0404 |
| 2007/0112078 A1 | * | 5/2007 | Procter | .............. B01D 19/0409 516/117 |
| 2012/0329701 A1 | * | 12/2012 | Paul | .................... B01D 19/0409 510/513 |

FOREIGN PATENT DOCUMENTS

| EP | 0092003 | 10/1983 |
| EP | 0685250 | 12/1995 |
| GB | 892787 | 3/1962 |
| WO | WO2011107361 | 9/2011 |
| WO | WO2013182860 | 12/2013 |

OTHER PUBLICATIONS

Jan. 23, 2015, International Search Report and Written Opinion issued in application PCT/IN2014/000548.

* cited by examiner

Primary Examiner — Charles I Boyer
(74) Attorney, Agent, or Firm — Niefeld IP Law, PC

(57) ABSTRACT

A delayed antifoam composition used in laundry detergent comprising an amino silicone antifoam fluid that selectively use alkyl groups selectively being R and R2 where R is a monovalent C1- to C6-alkyl radical, and R2 is a monovalent C2- to C6-alkyl radical, when in selective combination with a water soluble filler material sufficiently and effectively depresses foam at the rinsing stage without even affecting the foam depression in the washing stage. The process of making delayed antifoam detergent composition. The composition is used in diverse applications such as personal care, hair care, textile, and release and alike.

8 Claims, No Drawings

COMPOSITION AND PROCESS OF MAKING AN AMINO SILICONE BASED DELAYED ANTIFOAM FOR USE IN LAUNDRY DETERGENT

FIELD OF INVENTION

The present invention relates to laundry detergent formulation for hand wash and/or machine wash comprising a delay antifoam composition and, in particular, relates to powder or liquid composition comprising an amino silicone antifoam fluid in combination with a water soluble filler material that would meet consumer's acceptability of detergent in hand wash and/or machine wash laundry applications involving:
  a. Good foam during washing i.e. during prewash or post wash
  b. Faster rinsing The present invention thus provides a delay antifoam detergent that would be capable of sufficiently depressing foam at the rinsing stage but would not affect the foam depression in the washing stage and would thus meet the consumer's preferences for such detergent formulations in hand wash and/or machine wash laundry applications.

BACKGROUND

Today hand washing laundry is the main washing habit for developing & emerging (D&E) countries all over the world. It is also true that hand washing laundry will continue for some more decades due to socio economical reason. Especially, lower income people are the main user for hand wash laundry. In many D & E countries, hand wash laundry detergent is still available for less than one dollar per kilogram and lower income people are getting clean water at free of cost. These points are the basic reasons for continuing such laundry habit for longer time. Consumers in hand wash laundry believe that detergent producing good amount of lather during washing is the best quality detergent for removing dirt from fabrics i.e. foam quantity during the washing in hand wash laundry is very important. As a result, multiple numbers of rinsing is required during the rinsing stage for removing excessive foam from the fabrics i.e. huge amount of clean water is used during the hand wash laundry only for removing loam from rinsing water although realistically residual dirt gets removed from fabric after 1 to 2 rinses.

In hand washing process, water is taken in a bucket or in fabric's soaking container or in case of machine washing process water is taken in a washing tub in washing machine. Thereafter, desired quantity of detergent is added to generate lather by hand shaking or the washing tub in washing machine is run for a while. This is followed by immersion of the dirt fabrics for soaking for 10 to 30 min. After soaking period, the fabric is rubbed by hand to remove dirt or the washing cycle is run for 10 to 20 min in case of machines wash.

For rinsing, the dirt water is drained out and excess dirt water is removed by squeezing the fabrics. Thus each such rinsing cycle consists of squeezing the fabrics and rinsing the fabrics with fresh water. Such rinsing cycle is repeated for four to five times for hand wash or in case of machine, four to five times rinse cycle is followed to remove all foams before final spinning. It is also a fact that in some areas people are paying higher amount of price for water used in rinsing due to the fact of using high foaming detergent in hand wash laundry. It is also a fact that consumers in hand wash laundry is not only spending extra money for rinsing water or wasting clean water in rinsing stage due to foam but also spending longer laundry time to complete one hand wash laundry. It is also true that consumer in hand wash laundry can buy water for rinsing or don't care to waste clean water for rinsing but are not ready to pay additional money for hand wash detergent which delivers less water usage in rinsing.

Attempts have been made in the past to resolve this problem by secondary method, called single rinse concept where during rinsing cycle, use of a defoamer containing fabric conditioner where fabric conditioner conditions the fabric at rinsing cycle and in addition kills all the residual foam. This concept was not very much successful in case of hand washing process, since use of fabric conditioner in this class is considered to be a luxury and people of handwashing segment uses hand washing due to money constraint for fabric cleaning.

Considering the billion tons of clean precious water wastage and sensitive formulation cost for normal detergent used in hand wash laundry or machine wash, there has been a need for detergent formulations which when used for washing fabrics most likely generates preferred amount of foaming during washing cycle without affecting the cleaning nature of the detergent but also have antifoaming activity in rinsing cycle so that one or two rinse is enough, to clean the fabric without effecting much detergent formulation cost. It is however extremely difficult to provide for such characteristics in detergent formulations which would favour both the washing and rinsing cycles and make washing of clothes/fabrics more convenient and user friendly apart from taking care of avoiding unnecessary wastage of valuable water and saving the environment from unnecessarily wastage of water in hand wash laundry and/or machine washing.

EP 0685250A1 disclosed a foam control composition which acts as a foam inhibiting agent in rinsing cycles when use in together with detergent. Table 1 therein reveals washing stage foam height from 2 cm to 9 cm for examples 1 to 4 against blank foam height 13 cm. Therefore, the washing stage foam height deterioration is strongly evident when compared to the blank that is even less than the blank in the case of this prior art composition which constitutes a major drawback or failure to meet the fundamental requirements of good foam control composition favouring same foam height as that of blank or avoiding reduction of foam quantity during the washing stage. Thus the foam control composition of EP 0685250A1 in any hand washing laundry detergent composition cannot be considered beneficial for the consumers desirous of having good foam in the washing cycle and no foaming in just after 1-2 rinse cycles.

WO2011107361A discloses a delayed antifoam composition that has a polyoxyalkylene group as the terminal group of the polyether containing aminosiloxane. The production of polyether containing amino siloxanes of WO2011107361A is expensive. In practice such materials are produced through equilibrium reaction starting from OH-terminated polydimethylsiloxanes, $\alpha$, $\omega$-polyether-functional siloxanes and hydrolysates of corresponding aminoalkylsilane. There is a major disadvantage that often in this synthesis the two-phase reaction mixture results; since, because of different polarities the polyether siloxane is not compatible with the remaining components.

DE102012210211A1 also disclosed an antifoaming agent having delayed antifoaming agent in the detergent composition. It would be found that under Examples 1-5 and comparison example in DE102012210211A1 while obliging defoaming during rinsing reveals significant percent reduction of foam during the washing process than the blank sample. Also closer comparison of [%] foam in the washing process as compared to rinse 1 process reveals that the percent foam in the washing process is lesser than the percentage of foam in the rinse 1 process which go to demonstrate that antifoaming action is more active or more inherent in the washing process than in rinsing process and hence not desirable.

It is thus apparently clear from the above state of art that the delayed antifoam in the hand wash and machine wash does not only suppress foam at the rinsing stage but also suppresses foam in the washing stage, and moreover, for certain antifoam compounds the difficulty in preparing and the involvement of high cost makes it undesirable for use in hand wash or machine wash laundry.

Thus it is a need in the art to obtain cost-effective laundry formulation that would have sufficient foam depression property in the rinsing stage without affecting the foam height during the washing stage and at the same time would also be easy to synthesize.

OBJECTS OF THE INVENTION

It is thus a basic objective of this invention to provide delay antifoam detergent composition comprising an amino silicone antifoam fluidalong with a water soluble filler material that would sufficiently depress foam in the rinsing stage but not at the expense of affecting/depressing the required foam height in the washing stage.

Another objective of the present invention is to provide delay antifoam detergent composition which would serve to save fresh water and to reduce the wastage of huge amount of water during the hand wash or machine wash laundry for cloth or fabric washing.

Another object of the invention is to provide a cost effective antifoam composition for use in diverse application such as in personal care, especially hair care, home care, textile care, and the like.

SUMMARY OF THE INVENTION

Thus according to the basic aspect of the present invention there is provided delayed antifoam composition comprising:

(i) 1 to 35% by weight of an amino silicone antifoam fluid, of the formula $$Y_j R^1_{3-j} SiO(RR^2 SiO)_z (YR^1 SiO)_n (Me_2 SiO)_v SiR^1_{3-k} Y_k \quad (I)$$

where
Y is an amino group of the general formula, $$-R^3-[NR^4-(CH_2)_m-]_x NR^5 R^6 \quad (II)$$

or the protonated or acylated amino forms of the amino group Y, $R^1$ is the same or different and is a monovalent $C_1$- to $C_6$-alkyl radical or a $C_1$- to $C_6$-alkoxy radical or a hydroxyl radical, R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 0.1 to 500,
n is an integer from 1 to 70,
m is an integer from 1 to 10,
v is an integer from 0 to 15,
x is an integer from 0 to 1, $R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and (ii) 65 to 99% by weight of a water soluble carrier filler selected from the group comprising sodium carbonate, sodium sulphate, potassium carbonate, potassium sulphate, sodium bicarbonate, potassium bicarbonate, water soluble starch and alike and its mixtures thereof.

The present invention is thus based on a very surprising finding that by restricting the chain length of the alkyl groups on the main siloxane chain of the antifoam compound of the present invention to $C_6$ atoms, the same in combination with water soluble carrier filler, showed a special and unexpected superior efficacy of absolutely no suppression of foam height during the washing stage and advantageous suppression of foam height in the rinsing stage that is principally desired of a delayed defoamer and compositions thereof for use in laundry formulations for both hand wash and machine wash.

Yet unexpectedly and most importantly it was also found by way of the present invention that upon reducing the carbon chain lengths of the both the alkyl groups on the silicon atom on the main siloxane chain to C1 i.e. by employing both alkyl groups as methyl on the said Si atom of the antifoam compound of the present invention together with a water soluble carrier filler as a formulation/composition, the said superior effect of absolutely no suppression of foam height during the washing stage and advantageous suppression of foam height in the rinsing stage died down, which could be regained when one methyl was replaced by an ethyl substituent. Thus while the superior effect died down when $R=R^2=CH_3$ on the Si atom of the main siloxane chain the surprising and unexpected special effects of no foam reduction in wash cycle and foam reduction in rinse cycle was again observed when the alkyl groups on the silicon atom on the main siloxane chain of the defoamer of the present invention involves R and $R^2$, being selectively defined as R is a monovalent C1- to C6-alkyl radical,
$R^2$ is a monovalent C2- to C6-alkyl radical.

According to a preferred aspect of the present invention there is provided said composition wherein the amine value of the amino silicone antifoam fluid is from 30 to 200 of KOH/gm sample.

Preferably in said composition R is $C_1$- to $C_6$-alkyl radical, is selected from the group consisting of methyl, ethyl, n-propyl, isopropyl, 1-n-butyl, isobutyl, tert-butyl, n-pentyl, isopentyl, neopentyl and tert-pentyl, n-hexyl, isomers of hexyl radical such as 2-methyl pentyl, 3-methyl pentyl, 2,2-dimethyl butyl, 2,3-dimethyl butyl radical and mixtures thereof.

Preferably also in said composition $R^2$ is $C_2$- to $C_6$-alkyl radical is selected from the group consisting of ethyl, n-propyl, isopropyl, 1-n-butyl, 2-n-butyl, isobutyl, tert-butyl, n-pentyl, isopentyl, neopentyl and tert-pentyl radical, n-hexyl, isomers of hexyl radical such as 2-methyl pentyl, 3-methyl pentyl, 2,2-dimethyl butyl, 2,3-dimethyl butyl and mixtures thereof.

According to another preferred aspect of the present invention there is provided said composition wherein the amino radical Y is selected from the group consisting of —$(CH_2)_3NH_2$, —$(CH_2)_3NH(CH_2)_2NH_2$, —$(CH_2)_3NHC_6H_{11}$, —$(CH_2)_3NH(CH_2)_2NHC_6H_{11}$, —$(CH(CH_3)CH_2CH_2)NH_2$, —$(CH(CH_3)CH_2CH_2)NH(CH_2)_2NH_2$, —$(CH_2)NH_2$; —$(CH_2)NH(CH_2)_2NH_2$, —$(CH(CH_3)CH_2CH_2)NHC_6H_{11}$, —$(CH(CH_3)CH_2CH_2)NH(CH_2)$ $NHC_6H_{11}$, —$CH_2NHC_6H_{11}$, —$CH_2NH(CH_2)_2NHC_6H_{11}$ and its protonated or acylated form or its mixtures thereof.

According to yet another preferred aspect of the present invention there is provided said composition, wherein the amino radical Y is selected from the group consisting of —$CH_2)_3NH_2$, —$(CH_2)_3NH(CH_2)_2NH_2$ and its protonated or acylated form or its mixtures thereof.

According to another aspect of the present invention a process for preparation of said composition is provided comprising the steps of:

a. polymerizing trialkylsiloxy terminated polydialkylsiloxane of formula $R_3SiO$—$(RR^2SiO)_p$—$SiR_3$, where R is a monovalent $C_1$- to $C_6$-alkyl radical or its isomers, $R^2$ it is a monovalent $C_2$- to $C_6$-alkyl radical, and p is an integer from 1 to 500, and an amino silane or a hydrolysate of amino silane of formula $YSiR^1(OR^{11})_2$, where $R^{11}$ is a $C_1$-$C_4$-alkyl radical, Y is an amino group of the general formula (II), $R^1$ is the same or different and is a monovalent to $C_6$-alkyl radical or a $C_1$- to $C_6$-alkoxy radical or a hydroxyl radical, to form the amino silicone antifoam fluid of formula (I);

b. mixing the antifoam amino silicone antifoam fluid with a water soluble carrier filler selected from the group comprising sodium carbonate, sodium sulphate, potassium carbonate, potassium sulphate, sodium bicarbonate, potassium bicarbonate and water soluble starch dr alike to form the composition.

According to another aspect of the present invention there is provided a laundry detergent composition for machine or hand washing in powder form comprising:

(i) 0.5 to 5% by weight of an antifoam powder of the total amount of the laundry detergent composition comprising:

1 to 35.% by weight of an amino silicone antifoam fluid, of the formula

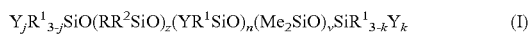  (I)

where
Y is an amino group of the general formula,

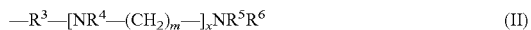  (II)

or the protonated or acylatedamino forms of the amino group Y, $R^1$ is the same or different and is a monovalent $C_1$- to $C_6$-alkyl radical or a $C_1$- to $C_6$-alkoxy radical or a hydroxyl radical,
R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 1 to 500,
n is an integer from 1 to 70,
m is an integer from 1 to 10,
v is an integer from 0 to 15,
x is an integer from 0 to 1,
$R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and (ii) 65 to 99% by weight of a water soluble carrier filler selected from the group comprising of sodium carbonate, sodium sulphate, potassium carbonate, potassium sulphate, sodium bicarbonate, potassium bicarbonate and water soluble starch and mixtures thereof; and (iii) 95 to 99.5% by weight of common hands wash laundry detergent ingredients.

Thus, the delayed antifoam composition of the present advancement selectively involves the delayed antifoam composition comprising:

(i) 1 to 35% by weight of an amino silicone antifoam fluid, of the formula

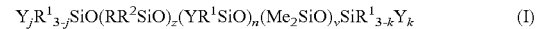  (I)

where
Y is an amino group of the general formula,

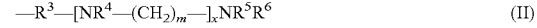  (II)

or the protonated or acylatedaminoforms of the amino group Y, $R^1$ is the same or different and is a monovalent $C_1$- to $C_6$-alkyl radical or a $C_1$- to $C_6$-alkoxy radical or a hydroxyl radical,
R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 1 to 500,
n is an integer from 1 to 70,
m is an integer from 1 to 10,
v is an integer from 0 to 15,
x is an integer from 0 to 1,
$R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and (ii) 65 to 99% by weight of a water soluble carrier filler selected from the group comprising sodium carbonate, sodium sulphate, potassium carbonate, potassium sulphate, sodium bicarbonate, potassium bicarbonate and water soluble starch and mixtures thereof and alike.

The present invention is explained hereunder in greater details in relation to the non-limiting exemplary illustrations that should not be construed to limit the scope of the present invention.

DETAILED DESCRIPTION OF THE INVENTION

As discussed hereinbefore, the present invention relates to a laundry detergent formulation for hand wash and/or machine wash comprising a delay antifoam composition and in particular relates to powder or liquid composition comprising an amino silicone antifoam fluidalong with afiller material that is water soluble and favourably specifically meets the much desired consumer's acceptability of detergent for hand wash/machine wash laundry with good foaming during washing stage i.e. during prewash or post wash and faster rinsing with complete suppression of foam/no foam in just 1-2 rinses.

The present invention therefore provides a delay antifoam detergent that sufficiently depresses foam at the rinsing stage but do not affect the foam depression in the washing stage.

According to basic aspect of the invention a delayed antifoam composition comprising:

(i) 1 to 35% by weight of an amino silicone antifoam fluid, of the formula

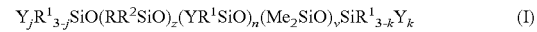  (I)

where
Y is an amino group of the general formula,

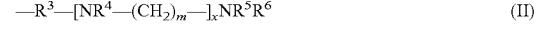  (II)

or the protonated or acylatedaminoforms of the amino group Y, $R^1$ is the same or different and is a monovalent $C_1$- to $C_6$-alkyl radical or a $C_1$- to $C_6$-alkoxy radical or a hydroxyl radical, R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 1 to 500,
n is an integer from 1 to 70,
m is an integer from 1 to 10,
v is an integer from 0 to 15,
x is an integer from 0 to 1,
$R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and (ii) 65 to 99% by weight of a water soluble carrier filler selected from the group comprising sodium carbonate, sodium sulphate, potassium carbonate, potassium sulphate, sodium bicarbonate, potassium bicarbonate and water soluble starch and mixtures thereof and alike.

Another aspect of the invention is directed towards a process for preparation of the composition comprising:

a. polymerizing trialkylsiloxy terminated polydialkylsiloxane preferably a trialkylsiloxy terminated polydialkylsiloxane of the formula $R_3SiO$—$(RR^2SiO)_p$—$SiR_3$, wherein R is a monovalent $C_1$- to $C_6$-alkyl radical or its isomers, $R^2$ is a monovalent. $C_2$- to $C_6$-alkyl, and p is an integer from 1 to 500;

and a hydrolysate of amino silane, preferably a hydrolysate of an amino silane of the formula $YSiR^1(OR^{11})_2$, wherein $R^{11}$ is a $C_1$-$C_4$-alkyl radical, and Y is an amino group of the general formula (II), $R^1$ is the same or different and is a monovalent $C_1$- to $C_6$-alkyl radical or a $C_1$- to $C_6$-alkoxy radical or a hydroxyl radical, and optionally a trimethylsiloxy terminated dimethylpolysiloxane, preferably having a viscosity of less than 100 mPa·s at 25° C., to form the amino silicone antifoam fluid of formula (I);

b. mixing the antifoam amino silicone antifoam fluid with a water soluble carrier filler selected from the group comprising sodium carbonate, sodium sulphate, potassium carbonate, potassium sulphate, sodium bicarbonate, potassium bicarbonate and water soluble starch or alike to form the composition.

Another aspect of the invention is directed towards a laundry detergent composition for machine or hand washing in powder form comprising:

(i) 0.5 to 5% by weight of an antifoam powder of the total amount of the laundry detergent composition comprising:

1 to 35% by weight of an amino silicone antifoam fluid, of the formula

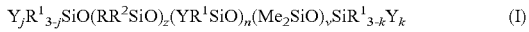   (I)

where
Y is an amino group of the general formula,

   (II)

or the protonated or acylatedaminoforms of the amino group Y,
$R^1$ is the same or different and is a monovalent $C_1$- to $C_6$-alkyl radical or a $C_1$- to $C_6$-alkoxy radical or a hydroxyl radical,
R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 1 to 500,
n is an integer from 1 to 70,
m is an integer from 1 to 10,
v is an integer from 0 to 15,
x is an integer from 0 to 1,
$R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and (ii) 65 to 99% by weight of a water soluble carrier filler selected from the group comprising of sodium carbonate, sodium sulphate, potassium carbonate, potassium sulphate, sodium bicarbonate, potassium bicarbonate and water soluble starch and mixtures thereof; and (iii) 95 to 99.5% by weight of common hands wash laundry detergent ingredients.

Example of hydrocarbons as alkyl radicals such as methyl, ethyl, n-propyl, isopropyl, n-butyl, 2, isobutyl, tert-butyl, n-pentyl, isopentyl, neopentyl and tert-pentyl radicals, hexyl radicals such as the n-hexyl radical, isomers of hexyl radical such as 2-methyl pentyl, 3-methyl pentyl, 2,2-dimethyl butyl, 2,3-dimethyl butyl.

The water soluble carrier filler is selected from any inorganic, organic or its salts thereof. The water soluble carrier filler is having the water solubility in the range from 50 to 500 g/l at 25° C.

In one of the embodiments, the amine value is determined by acid-base titration using a potentiometer [Make: Veego, Mumbai, India; Model: VPT-MG]. 0.6 g of sample is taken in a 500 ml beaker and toluene-butanol 1:1 mixture is added, and stirred to mix the sample thoroughly and the sample solution is titrated with a 0.1(N) HCl solution. The amine value is calculated according to the formula (56.11×V× N)/W mg KOH/g of sample, where, V=Volume of HCl required in ml,
N=Normality of HCl i.e. 0.1N,
W=Weight of the sample taken in gram.

In another embodiment, the amine value of the amino silicone antifoam fluid is from 30 to 200 mg of KOH/gm sample. More preferably, the amine value of the amino silicone antifoam fluid from 90 to 160 mg of KOH/gm sample.

The viscosity of the amino silicone antifoam fluid is between 700 to 3500 mPa·s at 25° C. The viscosity is measured at 25° C. by Anton Paar Rheometer; model MCR101, geometry single gap cylinder: CC 27 spindle and shear rate 1 s$^{-1}$. More preferably the viscosity is between 900 to 1500 mPa·s at 25° C. or between 1550 to 2500 mPa·s at 25° C. or between 2500 to 3500 mPa·s at 25° C.

In an another embodiment, the R radical is selected from the group consisting of methyl, ethyl, n-propyl, isopropyl, 1-n-butyl, isobutyl, tert-butyl, n-pentyl, isopentyl, neopentyl and tert-pentyl radical, n-hexyl, isomers of hexyl radical such as 2-methyl pentyl, 3-methyl pentyl, 2,2-dimethyl butyl, 2,3-dimethyl butyl radical and mixtures thereof. In one embodiment, R is preferably methyl. In another embodiment R is preferably ethyl. Most preferably R is selected from methyl, ethyl or mixture thereof.

Examples of hydrocarbons $R^2$ are alkyl radicals, such as the ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, isomers of hexyl radical such as 2-methyl pentyl, 3-methyl pentyl, 2,2-dimethyl butyl, 2,3-dimethyl butyl radical and mixtures thereof. Most preferred $R^2$ is the ethyl radical.

In an another embodiment, the $R^1$ radical is selected from the group consisting of methyl, ethyl, n-propyl, isopropyl, 1-n-butyl, isobutyl, tert-butyl, n-pentyl, isopentyl, neopentyl and tert-pentyl radical, n-hexyl, isomers of hexyl radical such as 2-methyl pentyl, 3-methyl pentyl, 2,2-dimethyl butyl, 2,3-dimethyl butyl radical and mixtures thereof.

In another embodiment, $R^1$ as the alkoxy-radicals are $C_1$- to $C_6$-alkoxy radical which is the above described alkyl radicals bound through an oxygen atom.

In one aspect of the invention R is selected from the group comprising —$CH_3$, —$CH_2$—$CH_3$, —$(CH_2)_2$—$CH_3$, —$(CH_2)_3$—$CH_3$, —$(CH_2)_4$—$CH_3$, —$(CH_2)_5$—$CH_3$ and isomers thereof, $R^2$ is selected from the group comprising —$CH_2$—$CH_3$, —$(CH_2)_2$—$CH_3$, —$(CH_2)_3$—$CH_3$, —$(CH_2)_4$—$CH_3$, —$(CH_2)_5$—$CH_3$ and isomers thereof, z is from 1 to 500, n is from 1 to 70.

In another embodiment of the invention, the amino radical Y is selected from the group consisting of —$(CH_2)_3NH_2$, —$(CH_2)_3NH(CH_2)_2NH_2$, —$(CH_2)_3NHC_6H_{11}$, —$(CH_2)_3NH(CH_2)_2NHC_6H_{11}$, —$(CH(CH_3)CH_2CH_2)NH_2$, —$(CH(CH_3)CH_2CH_2)NH(CH_2)NH_2$, —$(CH_2)NH_2$; —$(CH_2)NH(CH_2)_2NH_2$, —$(CH(CH_3)CH_2CH_2)NHC_6H_{11}$, —$(CH(CH_3)CH_2CH_2)NH(CH_2)NHC_6H_{11}$, —$CH_2NH(CH_2)_2NHC_6H_{11}$ and its protonated or acylated form or its mixtures thereof, the amino radicals optionally being protonated, amine form or acylated. The amino radical Y is preferably selected from the group consisting of —$(CH_2)_3NH_2$, —$(CH_2)_3NH(CH_2)_2NH_2$ and its protonated or acylated form or its mixtures thereof.

In another embodiment, the $R^3$ is a $C_1$-$C_{10}$-alkylene radical is selected from linear or branched, or cyclic alkylene radicals like methylene, ethylene, propylene, butylene, pentylene, hexylene, heptylene, octylene, nonylene, decylene, its isomers or mixtures thereof.

In another embodiment, $R^4$, $R^5$ and $R^6$ is same or different and is selected from hydrogen or a $C_1$-$C_4$-alkyl radical, where $C_1$-$C_4$-alkyl radical is selected from the group consisting of methyl, ethyl, n-propyl, isopropyl, 1-n-butyl, isobutyl, tert-butyl or mixtures thereof.

In still another aspect of the invention there is provided a process for preparing the amino silicone antifoam fluid that comprises (I) reacting in a first step
(a) a hydrogen alkylsilane of the formula

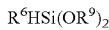
$R^8HSi(OR^9)_2$ where $R^8$ is hydrogen or methyl and $R^9$ is methyl and the hydrogen alkyl silane is most preferably selected from $H_2Si(OCH_3)_2$, $HCH_3Si(OCH_3)_2$ and mixtures thereof, with
(b) an alkylene compound of the formula

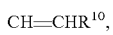
$CH=CHR^{10}$, where $R^{10}$ is hydrogen or a monovalent, $C_1$- to $C_4$-hydrocarbyl radical and alkylene compound of the formula is most preferably linear type $CH_2=CH_2$, $CH_2=CHCH_3$, $CH_2=CHCH_2CH_3$, $CH_2=CHCH_2CH_3$, $CH_2=CHCH_2$, $CH_2CH_3$, $CH_2=CHCH_2CH_2CH_2CH_3$ or similar type in branch structures, in the presence of
(c) a hydrosilylation catalyst, preferably a platinum catalyst,
(d) optionally reaction is carried out under moisture free nitrogen atmosphere, preferably at 60 to 120° C. and pressure 1-80 bar, preferably with proper cooling system to control temperature due to exothermic reaction, most preferably reaction is carried out at 25 to 50° C. and pressure 2-60 bar,
(e) co-hydrolysed 1-20 mole alkoxysilane from (d) with 2 mole trialkylalkoxysilane, preferably of the formula $R'_3Si(OR^*)_3$, wherein R' is a monovalent $C_1$- to $C_6$-alkyl radical and $R^*$ is a is a monovalent $C_1$- to $C_6$-alkyl radical, preferably in the presence of water or diluted acids and separate hydrolysed polymer from water alcohol mixture (II) reacting in a second step
(f) the resulting hydrosilylation product obtained from step (I) of the formula $R_3SiO$—$(RR^2SiO)_p$—$SiR_3$, where R is same or different from $R^2$ and is a monovalent $C_1$- to $C_6$-alkyl radical, $R^2$ is the same or different from R and is a monovalent $C_2$- to $C_6$-alkyl radical, and p is an integer from 1 to 500;
and most $(CH_3)_3$—$SiRR^2OSi$—$(CH_3)_3$, and
(g) a hydrolysate of aminoalkylsilane of the formula

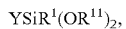
$YSiR^1(OR^{11})_2$, and most preferably $(CH_3O)_2Si(CH_3)$—$(CH_2)_3$—$NH(C_2H_4)NH_2$,
where $R^{11}$ is a $C_1$-$C_4$-alkyl radical,
(h) optionally trialkylsiloxy terminated organopolysiloxane is used as a chain termination group, such as trimethylsiloxy terminated dimethylpolysiloxane, preferably having a viscosity of less than 100 mPa·s at 25° C.,
in the presence of
(i) a basic catalyst, preferably potassium methoxide or potassium ethoxide, and at a temperature of from 80° C. to 150° C., and then, after the reaction (II)
(III) neutralizing the basic catalyst, by addition of a neutralizing agent, preferably a triorganosilyl phosphate, more preferably a trimethylsilyl phosphate,
The step (III) is preferably followed by step
(IV) stripping for removing the volatiles under vacuum with temperature between 130 to 200° C. and obtaining the amino silicone antifoam fluid therefrom.

In Step (I) preferably, 40 to 70 mol %, and more preferably 55 to 70 mol %, of the hydrogen alkyl polysiloxane is used. 30 to 60 mol %, and more preferably 30 to 50 mol %, alkylene compound of the formula $CH=CHR^{10}$, where $R^{10}$ is hydrogen or a monovalent, $C_1$- to $C_4$-hydrocarbyl radical is used. Wherein, the total mole percent is 100 mol %.

In Step (II) preferably, 60 to 90 parts per weight of the resulting hydrosilylation product obtained from step (I) of the $R_3SiO$—$(RR^1SiO)_p$—$SiR_3$, and
10 to 40 parts per weight of the hydrolysate of amino alkylsilane (f) of the formula $YSiR^1(OR^{11})_2$ is used.

The amino radicals Y in formula (I) can be protonated partially or fully or convert to amine partially or fully by adding acids to the amino silicone antifoam fluid wherein the salt forms of the amino radicals are obtained. Examples of acids are carboxylic acids with 3 to 18 carbon atoms which can be linear or branched, such as formic acid, acetic acid, propionic acid, butyric acid, pivalic acid, sorbic acid, benzoic acid, salicylic acid. The acids are preferably used in amounts of from 0.1 to 2.0 moles per 1 mole of amino radical Y in the amino silicone antifoam fluid of formula (I).

Protonated amino radicals Y' of the formula

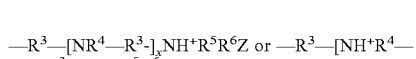
—$R^3$—$[NR^4$—$R^3$-$]_xNH^+R^5R^6Z^-$ or —$R^3$—$[NH^+R^4$—$R^3$-$]_xNH^+R^5R^6_{(x+1)}Z^-$ where $Z^-$ is an anion, preferably an anion of a corresponding acid; such as a carboxylate anion, for example an acetate anion, to the $N^+$, can be obtained.

The amino radicals Y in formula (I) can be acylated partially or fully or convert to amine partially or fully by adding acids to the amino silicone antifoam fluid.

Acylated amino radicals Y" of the formula

—$R^3$—$[NR^4$—$R^3$-$]_xNHCOR'$, wherein R' is any alkyl group.

According to another aspect of the invention there is provided a process for preparing the antifoam powder comprising the steps of (i) Transfer carrier filler in the mixer and mixture used for manufacturing powder defoamer is a standard powder liquid mixture like plough shear mixture where liquid addition in the powder can be done with certain flow rate by dripping or by spraying. Carrier filler should have low moisture (less than 2%). If moisture is high then the carrier filler is dried at 100° C. to 150° C. till it reach to less than 2% moisture, (ii) Dripping or spraying of amino silicone antifoam fluid of formula (I) on carrier is carried out at room temperature.

As discussed hereinbefore the present invention relates to an antifoam powder involving delay antifoam composition, and in particular, relates to the preparation of the said antifoam powder comprising amino silicone antifoam fluid absorbed in carrier filler, which can be used in laundry detergent formulation specially in fabric wash adapted for, excellent antifoaming effect in rinsing cycle while maintaining almost similar foaming nature compare to 'detergent without antifoam' in washing cycles.

Advantageously, the said detergent composition involving the delay antifoam composition is found to have excellent antifoaming effect in rinsing cycle while preferred foaming effect in washing cycle.

The present invention also relates to a process of synthesis of the amino silicone antifoam fluid based delay antifoam compound present in the said antifoam powder for use in detergent formulation wherein the said silicone compound generates preferred in-situ foaming properties of the said detergent formulation in washing cycle but acts as antifoam in rinsing cycle.

According to the present invention, performance of powder silicone antifoam comprising amino silicone antifoam fluid is confirmed by a unique mechanism that governs its role as an antifoam agent in rinsing cycles while maintaining preferred amount of foam in washing cycles.

Effective detergent compositions comprise anionic surfactants, particularly alkyl benzene sulfonate and alkyl sulfate surfactants. It has also been found beneficial for the appearance and cleaning of fabrics for laundry detergents to contain an amount of a cellulose enzyme sufficient to improve the appearance and cleaning of such fabrics, particularly after multiple cleaning cycles. But this anionic surfactant is important for cleaning and cheap source of generating substantial foam in the washing even at small amount.

In detergent powder, main foaming component is anionic surfactant. According to the present invention, when laundry detergent containing powder silicone antifoam is dissolved in water, huge amount of foam generates due to anionic surfactant and no interaction takes place between amino group of amino silicone antifoam fluid and anionic surfactant due to weak alkalinity of organic amine group present in the silicone molecule but on the other hand, during washing stage, washing liquor pKa value ($pK_a$ is the negative base-10 logarithm of the acid dissociation constant ($K_a$) of a solution. $pKa=-\log_{10}K_a$. The lower the $pK_a$ value, stronger the acid & higher the pKa value, stronger the base) is around 10-11 where Na$^+$ ion present in the detergent is more preferable to anionic detergent for making salt due to strong Na+ alkalinity. As soon as, the washing fabric come across the said liquor in the washing cycle, the amino silicone antifoam fluid penetrates inside the fiber due to its high affinity towards the fabric due to salt formation between week acidity of fabric and week base in silicone molecule (amine groups) and but due to high lather during washing cycle in machine wash or during rubbing the fabrics in hand wash after soaking with amino silicone antifoam fluid penetrated into the said fabric, the anionic surfactant can't come towards the amino group of amino silicone antifoam fluid to interact and form salt. Therefore, foaming nature of the detergent during prewash or in post wash does not change. In rinsing cycle, residual detergent transfers into fresh water by way of fabric which is remain after squeezing the washed fabrics. Therefore, pKa value rinsing liquor foam density reduces significantly (~7.5) due to less amount of detergent present in the liquor and hence, anionic surfactant easily reacts with amino group in silicone, attached to the fabric and form the salt with anionic surfactant. These salts transfer immediately to rinsing liquor and anionic surfactant lost foaming nature due, to salt formation with silicone and hence, foams in rinsing lather are eliminated in significant amounts. Specially, in case of hand wash, no foam is observed after 1 to 2 rinsing.

The details of the invention, its nature and objects are explained hereunder in greater detail in relation to the following non-limiting examples.

EXAMPLES

Example-1

165 g of a trimethylsiloxy terminated polyethylmethylsiloxane(main siloxane chain) and 36 g of an OH-terminated hydrolysate of aminoethylaminopropylmethyl-dimethoxysilane (amino siloxane and this fluid has an amine value 640 mg KOH/gm) are transferred in a reactor, and heated to 110° C. under $N_2$ purging (~0.7 lit/min). At this temperature (110° C.), 1.7 g 25% solution of tetramethyl ammonium hydroxide in methanol are added and reaction mixture is stirred for 2 hours under $N_2$. Again 1.8 g 25% solution of tetramethyl ammonium hydroxide in methanol is added in two hours interval and reaction mixture is stirred for 4 hrs under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & the vacuum is released. A clear oil with a viscosity of 910 mPa·s (25° C., by Anton PaarRheometer, model MCR101, geometry single gap cylinder: CC 27 spindle and shear rate 1 s$^{-1}$) and an amine value of 121 (=mg of KOH/gm sample) is obtained. In all the experiments the viscosity measured is by using the same machine and conditions.

Example-2

165 g of a Trimethylsiloxy terminated polymethylpropylsiloxane (main siloxane chain) is transferred in the reactor with all other ingredients as in example 1. The reaction process and conditions are kept same as per example 1. A clear oil with a viscosity of 1050 mPa·s (25° C.) and an amine value of 119.5 (=mg of KOH/gm sample) is obtained.

Example-3

165 g of a Trimethylsiloxy terminated polymethylbutylsiloxane (main siloxane chain) is transferred in the reactor with all other ingredients as in example 1. The reaction process and conditions are kept same as per example 1. A clear oil with a viscosity of 1270 mPa·s (25° C.) and an amine value of 121 (=mg of KOH/gm sample) is obtained.

Example-4

165 g of a Trimethylsiloxy terminated polymethylpentylsiloxane (main siloxane chain) is transferred in the reactor with all other ingredients as in example 1. The reaction process and conditions are kept same as per example 1. A clear oil with a viscosity of 1350 mPa·s (25° C.) and an amine value of 120.5 (=mg of KOH/gm sample) is obtained.

Example-5

165 g of a Trimethylsiloxy terminated polymethylhexylsiloxane (main siloxane chain) is transferred in the reactor with all other ingredients as in example 1. The reaction process and conditions are kept same as per example 1. A clear oil with a viscosity of 1400 mPa·s (25° C.) and an amine value of 118.9 (=mg of KOH/gm sample) is obtained.

Example-6

165 g of a Trimethylsiloxy terminated polydiethylsiloxane (main siloxane chain) is transferred in the reactor with all other ingredients as in example 1. The reaction process and conditions are kept same as per example 1. A clear oil with a viscosity of 1200 mPa·s (25° C.) and an amine value of 120.3 (=mg of KOH/gm sample) is obtained.

Example-7

165 g of a Trimethylsiloxy terminated polyethylpropylsiloxane (main siloxane chain) is transferred in the reactor with all other ingredients as in example 1. The reaction process and conditions are kept same as per example 1. A clear oil with a viscosity of 1320 mPa·s (25° C.) and an amine value of 119.2 (=mg of KOH/gm sample) is obtained.

Example-8

165 g of a Trimethylsiloxy terminated polyethylbutylsiloxane (main siloxane chain) is transferred in the reactor with all other ingredients as in example 1. The reaction process and conditions are kept same as per example 1. A clear oil with a viscosity of 1500 mPa·s (25° C.) and an amine value of 121.3 (=mg of KOH/gm sample) is obtained.

Example-9

165 g of a Trimethylsiloxy terminated polyethylpentylsiloxane (main siloxane chain) is transferred in the reactor with all other ingredients as in example 1. The reaction process and conditions are kept same as per example 1. A clear oil with a viscosity of 1575 mPa·s (25° C.) and an amine value of 119.4 (=mg of KOH/gm sample) is obtained.

Example-10

165 g of a Trimethylsiloxy terminated polyethylhexylsiloxane (main siloxane chain) is transferred in the reactor with all other ingredients as in example 1. The reaction process and conditions are kept same as per example 1. A clear oil with a viscosity of 1690 mPa·s (25° C.) and an amine value of 118.8 (=mg of KOH/gm sample) is obtained.

Example-11

165 g of a Trimethylsiloxy terminated polydipropylsiloxane (main siloxane chain) is transferred in the reactor with all other ingredients as in example 1. The reaction process and conditions are kept same as per example 1. A clear oil with a viscosity of 1370 mPa·s (25° C.) and an amine value of 119.5 (=mg of KOH/gm sample) is obtained.

Example-12

165 g of a Trimethylsiloxy terminated polypropylbutylsiloxane (main siloxane chain) is transferred in the reactor with all other ingredients as in example 1. The reaction process and conditions are kept same as per example 1. A clear oil with a viscosity of 1520 mPa·s (25° C.) and an amine value of 120.9 (=mg of KOH/gm sample) is obtained.

Example-13

165 g of a Trimethylsiloxy terminated polypropylpentylsiloxane (main siloxane chain) is transferred in the reactor with all other ingredients as in example 1. The reaction process and conditions are kept same as per example 1. A clear oil with a viscosity of 1680 mPa·s (25° C.) and an amine value of 119.8 (=mg of KOH/gm sample) is obtained.

Example-14

165 g of a Trimethylsiloxy terminated polypropylhexylsiloxane (main siloxane chain) is transferred in the reactor with all other ingredients as in example 1. The reaction process and conditions are kept same as per example 1. A clear oil with a viscosity of 1780 mPa·s (25° C.) and an amine value of 122 (=mg of KOH/gm sample) is obtained.

Example-15

165 g of a Trimethylsiloxy terminated polydibutylsiloxane (main siloxane chain) is transferred in the reactor with all other ingredients as in example 1. The reaction process and conditions are kept same as per example 1. A clear oil with a viscosity of 1460 mPa·s (25° C.) and an amine value of 119.4 (=mg of KOH/gm sample) is obtained.

Example-16

165 g of a Trimethylsiloxy terminated polybutylpentylsiloxane (main siloxane chain) is transferred in the reactor with all other ingredients as in example 1. The reaction process and conditions are kept same as per example 1. A clear oil with a viscosity of 1700 mPa·s (25° C.) and an amine value of 120.6 (=mg of KOH/gm sample) is obtained.

Example-17

165 g of a Trimethylsiloxy terminated polybutylhexylsiloxane (main siloxane chain) is transferred in the reactor with all other ingredients as in example 1. The reaction process and conditions are kept same as per example 1. A clear oil with a viscosity of 1890 mPa·s (25° C.) and an amine value of 120.7 (=mg of KOH/gm sample) is obtained.

Example-18

165 g of a Trimethylsiloxy terminated polydipentylsiloxane (main siloxane chain) is transferred in the reactor with all other ingredients as in example 1. The reaction process and conditions are kept same as per example 1. A clear oil with a viscosity of 1850 mPa·s (25° C.) and an amine value of 121.6 (=mg of KOH/gm sample) is obtained.

Example-19

165 g of a Trimethylsiloxy terminated, polypentylhexyl-siloxane (main siloxane chain) is transferred in the reactor with all other ingredients as in example 1. The reaction process and conditions are kept same as per example 1. A clear oil with a viscosity of 2050 mPa·s (25° C.) and an amine value of 120.4 (=mg of KOH/gm sample) is obtained.

Example-20

165 g of a Trimethylsiloxy terminated dihexylpolysiloxane (main siloxane chain) is transferred in the reactor with all other ingredients as in example 1. The reaction process and conditions are kept same as per example 1. A clear oil with a viscosity of 2240 mPa·s (25° C.) and an amine value of 120.1 (=mg of KOH/gm sample) is obtained.

Examples-21

153 g of a trimethylsiloxy terminated polyethylmethylsiloxane (main siloxane chain) and 48 g of an OH-terminated hydrolysate of aminopropylmethyl-dimethoxysilane(amino siloxane) are transferred in a reactor, and heated to 110° C. under $N_2$ purging (~0.7 lit/min). At this temperature (110° C.), 1.7 g 25% solution of tetramethyl ammonium hydroxide in methanol are added and reaction mixture is stirred for 2 hours under $N_2$. Again 1.8 g 25% solution of tetramethyl ammonium hydroxide in methanol is added in two hour interval and reaction mixture is stirred for 4 hrs under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr, then cooled to room temperature & vacuum released. A clear oil with a viscosity of 840 mPa·s at 25° C. and an amine value of 118.9 (=mg of KOH/gm sample) is obtained.

Examples-22

153 g of a Trimethylsiloxy terminated polymethylpropyl-siloxane (main siloxane chain) is transferred in the reactor with all other ingredients as in example 21. The reaction process and conditions are kept same as per example 21. A clear oil with a viscosity of 970 mPa·s at 25° C. and an amine value of 121 (=mg of KOH/gm sample) is obtained.

Examples-23

153 g of a Trimethylsiloxy terminated polymethylbutyl-siloxane (main siloxane chain) is transferred in the reactor with all other ingredients as in example 21. The reaction process and conditions are kept same as per example 21. A clear oil with a viscosity of 1120 mPa·s at 25° C. and an amine value of 118.7 (=mg of KOH/gm sample) is obtained.

Examples-24

153 g of a Trimethylsiloxy terminated polymethylpentyl-siloxane (main siloxane chain) is transferred in the reactor with all other ingredients as in example 21. The reaction process and conditions are kept same as per example 21. A clear oil with a viscosity of 1265 mPa·s at 25° C. and an amine value of 120.1 (=mg of KOH/gm sample) is obtained.

Examples-25

153 g of a Trimethylsiloxy terminated polymethyl hexyl siloxane (main siloxane chain) is transferred in the reactor with all other ingredients as in example 21. The reaction process and conditions are kept same as per example 21. A clear oil with a viscosity of 1335 mPa·s at 25° C. and an amine value of 117.9 (=mg of KOH/gm sample) is obtained.

Examples-26

153 g of a Trimethylsiloxy terminated polydiethyl siloxane (main siloxane chain) is transferred in the reactor with all other ingredients as in example 21. The reaction process and conditions are kept same as per example 21. A clear oil with a viscosity of 1125 mPa·s at 25° C. and an amine value of 119.1 (=mg of KOH/gm sample) is obtained.

Examples-27

153 g of a Trimethylsiloxy terminated polyethylpropyl-siloxane (main siloxane chain) is transferred in the reactor with all other ingredients as in example 21. The reaction process and conditions are kept same as per example 21. A clear oil with a viscosity of 1275 mPa·s at 25° C. and an amine value of 121.2 (=mg of KOH/gm sample) is obtained.

Examples-28

153 g of a Trimethylsiloxy terminated polyethyl butyl siloxane (main siloxane chain) is transferred in the reactor with all other ingredients as in example 21. The reaction process and conditions are kept same as per example 21. A clear oil with a viscosity of 1390 mPa·s at 25° C. and an amine value of 118.8 (=mg of KOH/gm sample) is obtained.

Examples-29

153 g of a Trimethylsiloxy terminated polyethylpentyl siloxane (main siloxane chain) is transferred in the reactor with all other ingredients as in example 21. The reaction process and conditions are kept same as per example 21. A clear oil with a viscosity of 1475 mPa·s at 25° C. and an amine value of 119.9 (=mg of KOH/gm sample) is obtained.

Examples-30

153 g of a Trimethylsiloxy terminated polyethyl hexyl siloxane (main siloxane chain) is transferred in the reactor with all other ingredients as in example 21. The reaction process and conditions are kept same as per example 21. A clear oil with a viscosity of 1520 mPa·s at 25° C. and an amine value of 120.6(=mg of KOH/gm sample) is obtained.

Examples-31

153 g of a Trimethylsiloxy terminated dipropylpolysiloxane (main siloxane chain) is transferred in the reactor with all other ingredients as in example 21: The reaction process and conditions are kept same as per example 21. A clear oil with a viscosity of 1310 mPa·s at 25° C. and an amine value of 122 (=mg of KOH/gm sample) is obtained.

Examples-32

153 g of a Trimethylsiloxy terminated polypropyl butyl siloxane (main siloxane chain) is transferred in the reactor with all other ingredients as in example 21. The reaction process and conditions are kept same as per example 21. A clear oil with a viscosity of 1420 mPa·s at 25° C. and an amine value of 120.2 (=mg of KOH/gm sample) is obtained.

Examples-33

153 g of a Trimethylsiloxy terminated polypropylpentyl siloxane (main siloxane chain) is transferred in the reactor with all other ingredients as in example 21. The reaction process and conditions are kept same as per example 21. A clear oil with a viscosity of 1540 mPa·s at 25° C. and an amine value of 119.5 (=mg of KOH/gm sample) is obtained.

Examples-34

153 g of a Trimethylsiloxy terminated polypropyl hexyl siloxane (main siloxane chain) is transferred in the reactor with all other ingredients as in example 21. The reaction process and conditions are kept same as per example 21. A clear oil with a viscosity of 1690 mPa·s at 25° C. and an amine value of 120.1 (=mg of KOH/gm sample) is obtained.

Examples-35

153 g of a Trimethylsiloxy terminated polydibutylsiloxane (main siloxane chain) is transferred in the reactor with all other ingredients as in example 21. The reaction process and conditions are kept same as per example 21. A clear oil with a viscosity of 1385 mPa·s at 25° C. and an amine value of 121.3 (=mg of KOH/gm sample) is obtained.

Examples-36

153 g of a Trimethylsiloxy terminated polybutylpentylsiloxane (main siloxane chain) is transferred in the reactor with all other ingredients as in example 21. The reaction process and conditions are kept same as per example 21. A clear oil with a viscosity of 1590 mPa·s at 25° C. and an amine value of 119.2 (=mg of KOH/gm sample) is obtained.

Examples-37

153 g of a Trimethylsiloxy terminated polybutylhexylsiloxane (main siloxane chain) is transferred in the reactor with all other ingredients as in example 21. The reaction process and conditions are kept same as per example 21. A clear oil with a viscosity of 1720 mPa·s at 25° C. and an amine value of 121.2 (=mg of KOH/gm sample) is obtained.

Examples-38

153 g of a Trimethylsiloxy terminated polydipentylsiloxane (main siloxane chain) is transferred in the reactor with all other ingredients as in example 21. The reaction process and conditions are kept same as per example 21. A clear oil with a viscosity of 1790 mPa·s at 25° C. and an amine value of 120.1 (=mg of KOH/gm sample) is obtained.

Examples-39

153 g of a Trimethylsiloxy terminated polypentylhexylsiloxane (main siloxane chain) is transferred in the reactor with all other ingredients as in example 21. The reaction process and conditions are kept same as per example 21. A clear oil with a viscosity of 1930 mPa·s at 25° C. and an amine value of 119.9 (=mg of KOH/gm sample) is obtained.

Examples-40

153 g of a Trimethylsiloxy terminated polydihexylsiloxane (main siloxane chain) is transferred in the reactor with all other ingredients as in example 21. The reaction process and conditions are kept same as per example 21. A clear oil with a viscosity of 2130 mPa·s at 25° C. and an amine value of 120.5 (=mg of KOH/gm sample) is obtained.

Example 41

161 g of a trimethylsiloxy terminated polyethylmethylsiloxane (main siloxane chain), 10 gm trimethylsiloxy terminated polydimethylsiloxane (polymer chain stopper) having viscosity 10 mPa·s at 25° C. and 30 g of an OH-terminated hydrolysate of aminoethylaminopropylmethyl-dimethoxysilane (amino siloxane) are transferred in a reactor, and heated to 110° C. under $N_2$ purging (~0.7 lit/min). At this temperature (110° C.), 1.7 g 25% solution of tetramethyl ammonium hydroxide in methanol are added and reaction mixture is stirred for 2 hrs under $N_2$. Again 1.8 g 25% solution of tetramethyl ammonium hydroxide in methanol is added in two hours interval and reaction mixture is stirred for 4 hrs under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & vacuum released. A clear oil with a viscosity of 954 mPa·s (25° C.) and an amine value of 99.9 (=mg of KOH/gm sample) is obtained.

Example 42

161 g of a Trimethylsiloxy terminated polymethylpropylsiloxane (main siloxane chain) is transferred in the reactor with all other ingredients as in example 41. The reaction process and conditions are kept same as per example 41. A clear oil with a viscosity of 1020 mPa·s (25° C.) and an amine value of 101 (=mg of KOH/gm sample) is obtained.

Example 43

161 g of a Trimethylsiloxy terminated polymethylbutylsiloxane (main siloxane chain) is transferred in the reactor with all other ingredients as in example 41. The reaction process and conditions are kept same as per example 41. A clear oil with a viscosity of 1200 mPa·s (25° C.) and an amine value of 100.2 (=mg of KOH/gm sample) is obtained.

Example 44

161 g of a Trimethylsiloxy terminated polymethylpentylsiloxane (main siloxane chain) is transferred in the reactor with all other ingredients as in example 41. The reaction process and conditions are kept same as per example 41. A clear oil with a viscosity of 1320 mPa·s (25° C.) and an amine value of 99.7 (=mg of KOH/gm sample) is obtained.

Example 45

161 g of a Trimethylsiloxy terminated polymethylhexylsiloxane (main siloxane chain) is transferred in the reactor with all other ingredients as in example 41. The reaction process and conditions are kept same as per example 41. A clear oil with a viscosity of 1470 mPa·s (25° C.) and an amine value of 98.9 (=mg of KOH/gm sample) is obtained.

Example 46

161 g of a Trimethylsiloxy terminated polydiethylsiloxane (main siloxane chain) is transferred in the reactor with all other ingredients as in example 41. The reaction process and conditions are kept same as per example 41. A clear oil with a viscosity of 1270 mPa·s (25° C.) and an amine value of 100.4 (=mg of KOH/gm sample) is obtained.

Example 47

161 g of a Trimethylsiloxy terminated polyethylpropylsiloxane (main siloxane chain) is transferred in the reactor with all other ingredients as in example 41. The reaction process and conditions are kept same as per example 41. A clear oil with a viscosity of 1440 mPa·s (25° C.) and an amine value of 101.4 (=mg of KOH/gm sample) is obtained.

Example 48

161 g of a Trimethylsiloxy terminated polyethylbutylsiloxane (main siloxane chain) is transferred in the reactor with all other ingredients as in example 41. The reaction process and conditions are kept same as per example 41. A clear oil with a viscosity of 1580 mPa·s (25° C.) and an amine value of 99.6 (=mg of KOH/gm sample) is obtained.

Example 49

161 g of a Trimethylsiloxy terminated polyethylpentylsiloxane (main siloxane chain) is transferred in the reactor with all other ingredients as in example 41. The reaction process and conditions are kept same as per example 41. A clear oil with a viscosity of 1660 mPa·s (25° C.) and an amine value of 98.9 (=mg of KOH/gm sample) is obtained.

Example 50

161 g of a Trimethylsiloxy terminated polyethylhexylsiloxane (main siloxane chain) is transferred in the reactor with all other ingredients as in example 41. The reaction process and conditions are kept same as per example 41. A clear oil with a viscosity of 1750 mPa·s (25° C.) and an amine value of 100.1 (=mg of KOH/gm sample) is obtained.

Example 51

161 g of a Trimethylsiloxy terminated polydipropylsiloxane (main siloxane chain) is transferred in the reactor with all other ingredients as in example 41. The reaction process and conditions are kept same as per example 41. A clear oil with a viscosity of 1450 mPa·s (25° C.) and an amine value of 99.4 (=mg of KOH/gm sample) is obtained.

Example 52

161 g of a Trimethylsiloxy terminated polypropylbutylsiloxane (main siloxane chain) is transferred in the reactor with all other ingredients as in example 41. The reaction process and conditions are kept same as per example 41. A clear oil with a viscosity of 1600 mPa·s (25° C.) and an amine value of 101.5 (=mg of KOH/gm sample) is obtained.

Example 53

161 g of a Trimethylsiloxy terminated polypropylpentylsiloxane (main siloxane chain) is transferred in the reactor with all other ingredients as in example 41. The reaction process and conditions are kept same as per example 41. A clear oil with a viscosity of 1750 mPa·s (25° C.) and an amine value of 101 (=mg of KOH/gm sample) is obtained.

Example 54

161 g of a Trimethylsiloxy terminated polypropylhexylsiloxane (main siloxane chain) is transferred in the reactor with all Other ingredients as in example 41. The reaction process and conditions are kept same as per example 41. A clear oil with a viscosity of 1870 mPa·s (25° C.) and an amine value of 99.1 (=mg of KOH/gm sample) is obtained.

Example 55

161 g of a Trimethylsiloxy terminated polydibutylsiloxane (main siloxane chain) is transferred in the reactor with all other ingredients as in example 41. The reaction process and conditions are kept same as per example 41. A clear oil with a viscosity of 1600 mPa·s (25° C.) and an amine value of 99.4 (=mg of KOH/gm sample) is obtained.

Example 56

161 g of a Trimethylsiloxy terminated polybutylpentylsiloxane (main siloxane chain) is transferred in the reactor with all other ingredients as in example 41. The reaction process and conditions are kept same as per example 41. A clear oil with a viscosity of 1790 mPa·s (25° C.) and an amine value of 100.7 (=mg of KOH/gm sample) is obtained.

Example 57

161 g of a Trimethylsiloxy terminated polybutylhexylsiloxane (main siloxane chain) is transferred in the reactor with all other ingredients as in example 41. The reaction process and conditions are kept same as per example 41. A clear oil with a viscosity of 2000 mPa·s (25° C.) and an amine value of 98.9 (=mg of KOH/gm sample) is obtained.

Example 58

161 g of a Trimethylsiloxy terminated polydipentylsiloxane (main siloxane chain) is transferred in the reactor with all other ingredients as in example 41. The reaction process and conditions are kept same as per example 41. A clear oil with a viscosity of 1950 mPa·s (25° C.) and an amine value of 100.3 (=mg of KOH/gm sample) is obtained.

Example 59

161 g of a Trimethylsiloxy terminated polypentylhexylsiloxane (main siloxane chain) is transferred in the reactor with all other ingredients as in example 41. The reaction process and conditions are kept same as per example 41. A clear oil with a viscosity of 2250 mPa·s (25° C.) and an amine value of 100.6 (=mg of KOH/gm sample) is obtained.

Example 60

161 g of a Trimethylsiloxy terminated polydihexylsiloxane (main siloxane chain) is transferred in the reactor with all other ingredients as in example 41. The reaction process and conditions are kept same as per example 41. A clear oil with a viscosity of 2400 mPa·s (25° C.) and an amine value of 101 (=mg of KOH/gm sample) is obtained.

Example 61

157 g of a trimethylsiloxy terminated polyethylmethylsiloxane (main siloxane chain) and 44 g of an OH-terminated hydrolysate of aminoethylaminopropylmethyldimethoxysilane (amino siloxane) are transferred in a reactor, and heated to 110° C. under $N_2$ purging (~0.7 lit/min). At this temperature (110° C.), 1.7 g 25% solution of tetramethyl ammonium hydroxide in methanol are added and reaction mixture is stirred for 2 hours under $N_2$. Again 1.8 g 25% solution of tetramethyl ammonium hydroxide in methanol is added in two hour interval and reaction mixture is stirred for 4 hrs under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & vacuum released. A clear oil with a viscosity of 750 mPa·s (25° C.) and an amine value of 145.1 (=mg of KOH/gm sample) is obtained.

Example 62

157 g of a Trimethylsiloxy terminated polymethylpropylsiloxane (main siloxane chain) is transferred in the reactor with all other ingredients as in example 61. The reaction process and conditions are kept same as per example 61. A clear oil with a viscosity of 810 mPa·s (25° C.) and an amine value of 146.3 (=mg of KOH/gm sample) is obtained.

Example 63

157 g of a Trimethylsiloxy terminated polymethylbutylsiloxane (main siloxane chain) is transferred in the reactor with all other ingredients as in example 61. The reaction process and conditions are kept same as per example 61. A clear oil with a viscosity of 950 mPa·s (25° C.) and an amine value of 144.7 (=mg of KOH/gm sample) is obtained.

Example 64

157 g of a Trimethylsiloxy terminated polymethylpentylsiloxane (main siloxane chain) is transferred in the reactor with all other ingredients as in example 61. The reaction process and conditions are kept same as per example 61. A clear oil with a viscosity of 1120 mPa·s (25° C.) and an amine value of 145.3 (=mg of KOH/gm sample) is obtained.

Example 65

157 g of a Trimethylsiloxy terminated polymethylhexylsiloxane (main siloxane chain) is transferred in the reactor with all other ingredients as in example 61. The reaction process and conditions are kept same as per example 61. A clear oil with a viscosity of 1275 mPa·s (25° C.) and an amine value of 145.2 (=mg of KOH/gm sample) is obtained.

Example 66

157 g of a Trimethylsiloxy terminated polydiethylsiloxane (main siloxane chain) is transferred in the reactor with all other ingredients as in example 61. The reaction process and conditions are kept same as per example 61. A clear oil with a viscosity of 1060 mPa·s (25° C.) and an amine value of 144.3 (=mg of KOH/gm sample) is obtained.

Example 67

157 g of a Trimethylsiloxy terminated polyethylpropylsiloxane (main siloxane chain) is transferred in the reactor with all other ingredients as in example 61. The reaction process and conditions are kept same as per example 61. A clear oil with a viscosity of 1190 mPa·s (25° C.) and an amine value of 146.1 (=mg of KOH/gm sample) is obtained.

Example 68

157 g of a Trimethylsiloxy terminated polyethylbutylsiloxane (main siloxane chain) is transferred in the reactor with all other ingredients as in example 61. The reaction process and conditions are kept same as per example 61. A clear oil with a viscosity of 1270 mPa·s (25° C.) and an amine value of 145.7 (=mg of KOH/gm sample) is obtained.

Example 69

157 g of a Trimethylsiloxy terminated polyethylpentylsiloxane (main siloxane chain) is transferred in the reactor with all other ingredients as in example 61. The reaction process and conditions are kept same as per example 61. A clear oil with a viscosity of 1360 mPa·s (25° C.) and an amine value of 145.8 (=mg of KOH/gm sample) is obtained.

Example 70

157 g of a Trimethylsiloxy terminated polyethylhexylsiloxane (main siloxane chain) is transferred in the reactor with all other ingredients as in example 61. The reaction process and conditions are kept same as per example 61. A clear oil with a viscosity of 1490 mPa·s (25° C.) and an amine value of 143.9 (=mg of KOH/gm sample) is obtained.

Example 71

157 g of a Trimethylsiloxy terminated polydipropylsiloxane (main siloxane chain) is transferred in the reactor with all other ingredients as in example 61. The reaction process and conditions are kept same as per example 61. A clear oil with a viscosity of 1200 mPa·s (25° C.) and an amine value of 145.6 (=mg of KOH/gm sample) is obtained.

Example 72

157 g of a Trimethylsiloxy terminated polypropylbutylsiloxane (main siloxane chain) is transferred in the reactor with all other ingredients as in example 61. The reaction process and conditions are kept same as per example 61. A clear oil with a viscosity of 1370 mPa·s (25° C.) and an amine value of 144.9 (=mg of KOH/gm sample) is obtained.

Example 73

157 g of a Trimethylsiloxy terminated polypropylpentylsiloxane (main siloxane chain) is transferred in the reactor with all other ingredients as in example 61. The reaction process and conditions are kept same as per example 61. A clear oil with a viscosity of 1430 mPa·s (25° C.) and an amine value of 144.2 (=mg of KOH/gm sample) is obtained.

Example 74

157 g of a Trimethylsiloxy terminated polypropylhexylsiloxane (main siloxane chain) is transferred in the reactor with all other ingredients as in example 61. The reaction process and conditions are kept same as per example 61. A clear oil with a viscosity of 1540 mPa·s (25° C.) and an amine value of 146.1 (=mg of KOH/gm sample) is obtained.

Example 75

157 g of a Trimethylsiloxy terminated polydibutylsiloxane (main siloxane chain) is transferred in the reactor with all other ingredient's as in example 61. The reaction process and conditions are kept same as per example 61. A clear oil with a viscosity of 1330 mPa·s (25° C.) and an amine value of 144.4 (=mg of KOH/gm sample) is obtained.

Example 76

157 g of a Trimethylsiloxy terminated polybutylpentylsiloxane (main siloxane chain) is transferred in the reactor with all other ingredients as in example 61. The reaction process and conditions are kept same as per example 61. A clear oil with a viscosity of 1450 mPa·s (25° C.) and an amine value of 145.9 (=mg of KOH/gm sample) is obtained.

Example 77

157 g of a Trimethylsiloxy terminated polybutylhexylsiloxane (main siloxane chain) is transferred in the reactor with all other ingredients as in example 61. The reaction process and conditions are kept same as per example 61. A clear oil with a viscosity of 1640 mPa·s (25° C.) and an amine value of 146.4 (=mg of KOH/gm sample) is obtained.

Example 78

157 g of a Trimethylsiloxy terminated polybutylhexylsiloxane (main siloxane chain) is transferred in the reactor with all other ingredients as in example 61. The reaction process and conditions are kept same as per example 61. A clear oil with a viscosity of 1640 mPa·s (25° C.) and an amine value of 146.4 (=mg of KOH/gm sample) is obtained.

Example 79

157 g of a Trimethylsiloxy terminated polypentylhexylsiloxane (main siloxane chain) is transferred in the reactor with all other ingredients as in example 61. The reaction process and conditions are kept same as per example 61. A clear oil with a viscosity of 1650 mPa·s (25° C.) and an amine value of 145.3 (=mg of KOH/gm sample) is obtained.

Example 80

157 g of a Trimethylsiloxy terminated polydihexylsiloxane (main siloxane chain) is transferred in the reactor with all other ingredients as in example 61. The reaction process and conditions are kept same as per example 61. A clear oil with a viscosity of 1740 mPa·s (25° C.) and an amine value of 144.9 (=mg of KOH/gm sample) is obtained.

Example 81 (Acylated Polymer)

200 gm of fluid obtained from Example 1 is transferred in the reactor and the fluid is heated to 105° C. under $N_2$ purging. 13 gm acetic acid is added and reaction is continued till acid carbonyl peak shift fully from 1730 $cm^{-1}$ to 1679.17 $cm^{-1}$ in infrared spectra. The fluid is cooled to room temperature. A clear oil with a viscosity of 1300 mPa·s (25° C.) and an amine value of 60(=mg of KOH/gm sample) is obtained.

Example 82 (Methyl Amino Fluid) AV 120

153 g of a OH-terminated polydimethyl siloxane having viscosity less than 150 mPa·s at 25° C. (main siloxane chain), 12.5 gm trimethylsiloxy terminated polydimethylsiloxane (polymer chain stopper) having viscosity 10 mPa·s at 25° C. and 33 g of an OH-terminated hydrolysate of aminoethylaminopropylmethyl-dimethoxysilane(amino siloxane) are transferred in a reactor, and heated to 110° C. under $N_2$ purging (~0.7 lit/min). At this temperature (110° C.), 1.7 g 25% solution of tetramethyl ammonium hydroxide in methanol is added and reaction mixture is stirred for 2 hours under $N_2$. Again 1.8 g 25% solution of tetramethyl ammonium hydroxide in methanol is added in two hour interval and reaction mixture is stirred for 4 hours under $N_2$. 0.33 g of Tris(trimethylsilyl) phosphate are added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & vacuum released. A clear oil with a viscosity of 1440 mPa·s (25° C.) and an amine value of 122 (=mg of KOH/gm sample) is obtained.

Example 83 (Methyl Amino Fluid and Made as Per Patent Reference EP 0685250A1) AV 100

160 g of a OH-terminated polydimethyl siloxane having viscosity less than 150 mPa·s at 25° C. (main siloxane chain), 12 gm trimethylsiloxy terminated polydimethylsiloxane (polymer chain stopper) having viscosity 10 mPa·s at 25° C. and 29 g of an OH-terminated hydrolysate of aminoethylaminopropylmethyl-dimethoxysilane (amino siloxane) are transferred in a reactor, and heated to 110° C. under N2 purging (~0.7 lit/min). At this temperature (110° C.), 1.7 g 25% solution of tetramethyl ammonium hydroxide in methanol are added and reaction mixture is stirred for 2 hrs under $N_2$. Again 1.8 g 25% solution of tetramethyl ammonium hydroxide in methanol is added in two hour interval and reaction mixture is stirred for 4 hrs under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr Then cooled to room temperature & vacuum released. A clear oil with a viscosity of 1210 mPa·s (25° C.) and an amine value of 102 (=mg of KOH/gm sample) is obtained.

Example 84 (Dodecyl Amino Fluid) AV 120

160 g of atrimethylsiloxy terminated methyl dodecyl poly siloxane having viscosity 1234 mPa·s at 25° C. (main siloxane chain), 4 gm trimethylsiloxy terminated polydimethylsiloxane (polymer chain stopper) having viscosity 10 mPa·s at 25° C. and 37 g of an OH-terminated hydrolysate of aminoethylaminopropylmethyl-dimethoxysilane (amino siloxane) are transferred in a reactor, and heated to 110° C. under N2 purging (~0.7 lit/min). At this temperature (110° C.), 1.7 g 25% solution of tetramethyl ammonium hydroxide in methanol are added and reaction mixture is stirred for 2 hours under $N_2$. Again 1.8 g 25% solution of tetramethyl ammonium hydroxide in methanol is added in two hour interval and reaction mixture is stirred for 4 hrs under $N_2$. 0.33 g of Tris(trimethylsilyl) phosphate are added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then, cooled to room temperature & vacuum released. A clear oil with a viscosity of 790 mPa·s (25° C.) and an amine value of 120.6 (=mg of KOH/gm sample) is obtained.

Example 85 (Octyl Amino Fluid) AV 120

160 g of a trimethylsiloxy terminated methyl octylpolysiloxane having viscosity 610 mPa·s at 25° C. (main siloxane chain), 4 gm trimethylsiloxy terminated polydimethylsiloxane (polymer chain stopper) having viscosity 10 mPa·s at 25° C. and 37 g of an OH-terminated hydrolysate of aminoethylaminopropylmethyl-dimethoxysilane (amino siloxane) are transferred in a reactor, and heated to 110° C. under N2 purging (~0.7 lit/min). At this temperature (110° C.), 1.7 g 25% solution of tetramethyl ammonium hydroxide in methanol are added and reaction mixture is stirred for 2 hrs under N2. Again 1.8 g 25% solution of tetramethyl ammonium hydroxide in methanol is added in two hr. interval and reaction mixture is stirred for 4 hrs under $N_2$. 0.33 g of Tris(trimethylsilyl) phosphate are added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & vacuum released. A clear oil with a viscosity of 650 mPa·s (25° C.) and an amine value of 118.86 (=mg of KOH/gm sample) is obtained.

Example 86 (Methyl Amino Fluid Made as Per Patent Reference DE102012210211A1) AV 157

107 g of a OH-terminated polydimethyl siloxane having viscosity 80 mPa·s at 25° C. (main siloxane chain), 54 gm trimethylsiloxy terminated polydimethylsiloxane (polymer chain stopper) having viscosity 20 mPa·s at 25° C. and 40 g of an OH-terminated hydrolysate of aminoethylaminopropylmethyldimethoxysilane (amino siloxane) are placed in a reactor, and heated to 120° C. under N2 purging (~0.7 lit/min). At this temperature 183 mg of 20% solution of KOH in methanol are added and the resulting reaction mixture is stirred for 2 hours at 120° C. and at a pressure of 70 mbar (under vacuum). The water formed is separated in the water separator. Then finally the vacuum is broken and the reaction mixture is cooled to 80° C. 59 mg of acetic acid are added for neutralization and the reaction mixture is stirred further for 30 min. Then cooled to room temperature, filtered and remove the volatile in a rotary evaporator evaporated at 150° C./1 mbar vacuum. Clear oil with a viscosity of 190 mPa·s (25° C.), and an amine value of 157 mg KOH/gram of sample is obtained.

Example 87 (Protonated Polymer)

Transfer 200 gm Exp-1 fluid in the reactor and heat the fluid to 60° C. under $N_2$ purging. 13 g of acetic acid is added and continue reaction till acid carbonyl peak shift fully from 1730 $cm^{-1}$ to 1560 $cm^{-1}$ in infrared spectra. Cool the fluid to room temperature. A clear oil with, a viscosity of 1850 mPa·s (25° C.) and an amine value of 120.1 (=mg of KOH/gm sample) is obtained.

Example 88 (AV 120 with Amino Propyl Silane)

153 g of a trimethylsiloxy-terminated dimethylpolysiloxane (main siloxane chain) and 48 g of an OH-terminated hydrolysate of aminopropylmethyl-dimethoxysilane (amino siloxane) are transferred in a reactor, and heated to 110° C. under $N_2$ purging (~0.7 lit/min). At this temperature (110° C.), 1.7 g 25% solution of tetramethyl ammonium hydroxide in methanol are added and reaction mixture is stirred for 2 hours under $N_2$. Again 1.8 g 25% solution of tetramethyl ammonium hydroxide in methanol is added in two hour interval and reaction mixture is stirred for 4 hours under $N_2$. 0.33 g of Tris(trimethylsilyl) phosphate is added for neutralization and the reaction mixture is stirred further for 30 min. Then the material is distilled at 150° C. under 1 mbar vacuum for 1 hr, then increased material temperature to 190° C. and distilled at 190° C./1 mbar for 2 hr and then cooled to room temperature & vacuum released. A clear oil with a viscosity of 840 mPa·s (25° C. and an amine value of 118.9 (=mg of KOH/gm sample) is obtained.

Example I: Detergent Formulation for Hand Wash: Without Antifoam Powder (Blank) (Made as U.S. Pat. No. 8,481,476B2)

| | |
|---|---|
| Linear Alkyl benzene sulfonate Salt = | 14.00 part |
| Sodium tripolyphosphate = | 26.40 part |
| Soda Ash = | 47.55 part |
| Sodium Sulphate = | 4.40 part |
| Sod. Perborate = | 6.85 part |
| TetraAcetylEthylene Diamine = | 0.5 part |
| Perfume = | 0.30 part |

Example II: Preparation of Antifoam Compound Formulation

Equipment used: 1 liter volume, Stainless steel plough shear mixer, with one side entry, high speed dispersing tool, suitability jacketed for nominal pressure hot-water/cold water, heating and cooling. All shaft glands are $N_2$ purged. Suitable dust separator installed at loading hopper and standard bottom drain provision. The method of making antifoam compound formulation:

a. 0.85 kg of commercial grade Sodium Carbonate powder is taken having particle size 125 micron into above mixer.

b. Stirred and heated to 130° C. under $N_2$ purge to dry the powder if moisture content above 3%. If powder is heated to 130° C. for removal of moisture, then cool the powder to room temperature under $N_2$ purging. If sodium carbonate powder contains less than 3% moisture, then powder heating is not required.

c. added amino silicone antifoam fluid of the present invention by metering pump. Ensured dispensing is uniform into the stirred mass.

d. Addition of 0.15 kg of above fluid is done in about 1 hour, while temperature is maintained below 40° C. e. Mixing is continued for another 1 hour after fluid addition.

Example III: Detergent Formulation for Hand Wash: With Antifoam Powder of the Present Invention (Made as U.S. Pat. No. 8,481,476B2)

| | |
|---|---|
| Linear Alkyl benzene sulfonate Salt = | 14.00 part |
| Sodium tripolyphosphate = | 26.40 part |
| Soda Ash = | 46.55 part |
| Sodium Sulphate = | 4.40 part |
| Sod. Perborate = | 6.85 part |
| TetraAcetylEthylene Diamine = | 0.5 part |
| Perfume = | 0.30 part |
| Antifoam powder (produced as per antifoam compound formulation above) = | 1.0 part |

Example IV: Preparation of Antifoam Compound Formulation with Water Insoluble Carrier Filler Equipment used: 1 liter volume, Stainless steel plough shear mixer, with one side entry, high speed dispersing tool, suitability jacketed for nominal pressure hot-water/cold water, heating and cooling. All shaft glands are $N_2$ purged. Suitable dust separator installed at loading hopper and standard bottom drain provision. The method of making the formulation with water insoluble carrier filler:

a. 0.85 kg of commercial grade zeolite powder is taken into above mixer.

b. added amino silicone antifoam fluid of the present invention by metering pump. Ensured dispensing is uniform into the stirred mass.

c. Addition of 0.15 kg of above fluid is done in about 1 hour, while temperature is maintained below 40° C.

d. Mixing is continued for another 1 hour after fluid addition.

Example V: Detergent Formulation for Hand Wash with Water Insoluble Carrier Filler: Example with Antifoam Powder of the Present Invention (Made as Per U.S. Pat. No. 8,481,476B2)

| | |
|---|---|
| Linear Alkyl benzene sulfonate Salt = | 14.00 part |
| Sodium tripolyphosphate = | 26.40 part |
| Soda Ash = | 46.55 part |
| Sodium Sulphate = | 4.40 part |
| Sod. Perborate = | 6.85 part |
| TetraAcetylEthylene Diamine = | 0.5 part |
| Perfume = | 0.30 part |
| Antifoam powder (produced in antifoam compound of formulation with water insoluble filler and fluid of Example 1) = | 1.0 part |

In hand wash application, respective detergent formulation with water soluble filler with different antifoam compound, produced with fluids in examples 1 to 88 marked as detergent Exp # (number of Exp).

Example VI: Detergent Formulation for Machine Wash: Example without Antifoam Powder of the Present Invention (BLANK) (Made as U.S. Pat. No. 8,481,476B2)

| | |
|---|---|
| Linear Alkyl benzene sulfonate Salt = | 10.00 part |
| Soap = | 1.25 part |
| Lauryl alcohol 7 EO = | 2.00 part |
| Sodium tripolyphosphate = | 26.40 part |
| Soda Ash = | 47.9 part |
| Sodium Sulphate = | 4.40 part |
| Enzyme Protease = | 0.40 part |
| Sod. Perborate = | 6.85 part |
| Tetra Acetyl Ethylene Diamine = | 0.5 part |
| Perfume = | 0.30 part |

Example VII: Detergent Formulation for Machine Wash: Example with Antifoam Powder of the Present Invention (Made as U.S. Pat. No. 8,481,476B2)

| | |
|---|---|
| Linear Alkyl benzene sulfonate Salt = | 10.00 part |
| Soap = | 1.25 part |
| Lauryl alcohol 7 EO = | 2.00 part |
| Sodium tripolyphosphate = | 26.40 part |
| Soda Ash = | 46.90 part |
| Sodium Sulphate = | 4.40 part |
| Enzyme Protease = | 0.40 part |
| Sod. Perborate = | 6.85 part |
| Tetra Acetyl Ethylene Diamine = | 0.5 part |
| Perfume = | 0.30 part |
| Antifoam powder (produced in antifoam powder of composition) = | 1.0 part |

Example VIII: Detergent Formulation for Machine Wash with Water Insoluble Carrier Filler: Example with Antifoam Powder of the Present Invention (Made as U.S. Pat. No. 8,481,476B2)

| | |
|---|---|
| Linear Alkyl benzene sulfonate Salt = | 10.00 part |
| Soap = | 1.25 part |
| Lauryl alcohol 7 EO = | 2.00 part |
| Sodium tripolyphosphate = | 26.40 part |
| Soda Ash = | 46.90 part |
| Sodium Sulphate = | 4.40 part |
| Enzyme Protease = | 0.40 part |
| Sod. Perborate = | 6.85 part |
| Tetra Acetyl Ethylene Diamine = | 0.5 part |
| Perfume = | 0.30 part |
| Antifoam powder (produced in antifoam compound of formulation with water insoluble filler and fluid of Example 1) = | 1.0 part |

Performance Evaluation (Hand Wash) (Followed as U.S. Pat. No. 8,481,476B2)

Protocol used for the evaluation of detergent in bucket by hand washing was as below a. used 24° fH hard water b. fabric to liquor ratio is 1:10 c. used 4 gpl detergent (gpl=grams per liter)

d. lathering is done for 20 sec and immerged the fabrics in bucket water.

e. washing cycle maintained 15 min or 30 min and measured lather height in every 5 min or 10 min intervals.

f. squeezed fabrics at 50% weight pick up g. rinsing is done in each case in fresh 24° fH hard water in ratio of rinse water 1 part and 7 part fresh water and then see whisking; squeezed fabrics at 50% weight pick up and measured the foam height in bucket.

Performance Evaluation (Machine Wash) (Followed as in U.S. Pat. No. 8,481,476B2)

Protocol used for the evaluation of detergent in top load automatic machine
  a. used 24° fH hard water
  b. fabric to liquor ratio is 1:10
  c. used 4 gpl detergent (gpl=grams per liter)
  d. washing cycle maintained 15 min or 30 min. Open the top lid of washing machine just before discharged the washing liquor (as soon as top lid opened, m/c stopped in operation automatically) and took out fabrics by squeezing so that fabric retained 50% wash liquor. After taking out the fabric, the foam height is measured.
  e. The top lid is closed and the machine is run. As soon as machine discharged the washing liquor, opened top lid of the machine and transferred the fabrics in the machine. Closed the top lid of machine and immediately machine is in operation for rinsing cycle. Open the top lid of washing machine just before discharged the $1^{st}$ rinsing liquor. Took out fabrics by squeezing so that fabrics retain 50% washed liquor. After taking out the fabric, measure the foam height and noted as $1^{st}$ rinsing foam height.
  f. Closed the top lid and followed step 'e' for foam height measurement of $2^{nd}$, $3^{rd}$ & $4^{th}$ rinsing.

TABLE 1

| | | | Hand wash performance result | | | | | | | |
|---|---|---|---|---|---|---|---|---|---|---|
| Detergent Sample's name | Detergent dosage, gpl | Washing time, min | Foam height during washing, cm, after | | | | Foam height after $1^{st}$ rinse, cm | Foam height after $2^{nd}$ rinse, cm | Foam height after $3^{rd}$ rinse, cm | Foam height after $4^{th}$ rinse, cm |
| | | | 0 min | 10 min | 20 min | 30 min | | | | |
| Blank | 4 | 30 | 10.5 | 10.5 | 10 | 9 | 2 | 1.5 | 1 | 0.5 |
| Exp-1 | 4 | 30 | 14 | 13 | 12 | 12 | 0.5 | 0 | — | — |
| Exp-2 | 4 | 30 | 13 | 12 | 12 | 12 | 1 | 0.5 | 0 | — |
| Exp-3 | 4 | 30 | 13 | 12 | 11 | 11 | 0.9 | 0.4 | 0 | — |
| Exp-4 | 4 | 30 | 13 | 11 | 10 | 10 | 1.1 | 0.4 | 0 | — |
| Exp-5 | 4 | 30 | 12 | 12 | 11 | 11 | 1 | 0.3 | 0 | — |
| Exp-6 | 4 | 30 | 12 | 12 | 11 | 11 | 1.2 | 0.3 | 0 | — |
| Exp-7 | 4 | 30 | 12 | 11 | 11 | 10 | 0.9 | 0.3 | 0 | — |
| Exp-8 | 4 | 30 | 12 | 12 | 11 | 11 | 1.4 | 0.4 | 0 | — |
| Exp-9 | 4 | 30 | 12 | 11 | 11 | 10 | 1.1 | 0.5 | 0 | — |
| Exp-10 | 4 | 30 | 12 | 12 | 11 | 11 | 1.2 | 0.5 | 0 | — |
| Exp-11 | 4 | 30 | 11 | 11 | 10 | 10 | 1.4 | 0.5 | 0 | — |
| Exp-12 | 4 | 30 | 11 | 10 | 10 | 9 | 1.1 | 0.4 | 0 | — |
| Exp-13 | 4 | 30 | 11 | 11 | 10 | 10 | 1.4 | 0.4 | 0 | — |
| Exp-14 | 4 | 30 | 11 | 11 | 11 | 11 | 1.3 | 0.4 | 0 | — |
| Exp-15 | 4 | 30 | 12 | 11 | 11 | 11 | 1.3 | 0.5 | 0 | — |
| Exp-16 | 4 | 30 | 12 | 12 | 11 | 10 | 1.1 | 0.4 | 0 | — |
| Exp-17 | 4 | 30 | 11 | 11 | 10 | 10 | 1.2 | 0.4 | 0 | — |
| Exp-18 | 4 | 30 | 12 | 12 | 11 | 10 | 1.2 | 0.4 | 0 | — |
| Exp-19 | 4 | 30 | 12 | 12 | 12 | 11 | 1.1 | 0.5 | 0 | — |
| Exp-20 | 4 | 30 | 12 | 11 | 11 | 10 | 1.4 | 0.5 | 0 | — |
| Exp-21 | 4 | 30 | 13 | 12 | 11 | 11 | 1.4 | 0.6 | 0 | — |
| Exp-22 | 4 | 30 | 12 | 12 | 11 | 11 | 1.2 | 0.5 | 0 | — |
| Exp-23 | 4 | 30 | 12 | 12 | 11 | 10 | 1.1 | 0.4 | 0 | — |
| Exp-24 | 4 | 30 | 11 | 11 | 11 | 10 | 1 | 0.3 | 0 | — |
| Exp-25 | 4 | 30 | 12 | 12 | 11 | 10 | 1.3 | 0.6 | 0 | — |
| Exp-26 | 4 | 30 | 12 | 11 | 11 | 10 | 1.2 | 0.5 | 0 | — |
| Exp-27 | 4 | 30 | 12 | 12 | 12 | 11 | 1.5 | 0.6 | 0 | — |
| Exp-28 | 4 | 30 | 11 | 11 | 10 | 10 | 1.2 | 0.5 | 0 | — |
| Exp-29 | 4 | 30 | 12 | 11 | 11 | 10 | 1.1 | 0.5 | 0 | — |
| Exp-30 | 4 | 30 | 12 | 11 | 11 | 10 | 1 | 0.3 | 0 | — |
| Exp-31 | 4 | 30 | 12 | 12 | 11 | 10 | 0.8 | 0.3 | 0 | — |
| Exp-32 | 4 | 30 | 12 | 11 | 10 | 9 | 1.1 | 0.4 | 0 | — |
| Exp-33 | 4 | 30 | 12 | 11 | 11 | 10 | 1.2 | 0.5 | 0 | — |
| Exp-34 | 4 | 30 | 12 | 11 | 11 | 10 | 1 | 0.4 | 0 | — |
| Exp-35 | 4 | 30 | 11 | 11 | 10 | 10 | 1.2 | 0.4 | 0 | — |
| Exp-36 | 4 | 30 | 11 | 11 | 10 | 9 | 1.3 | 0.5 | 0 | — |
| Exp-37 | 4 | 30 | 11 | 11 | 10 | 10 | 0.9 | 0.3 | 0 | — |
| Exp-38 | 4 | 30 | 12 | 11 | 11 | 10 | 1.2 | 0.5 | 0 | — |
| Exp-39 | 4 | 30 | 12 | 11 | 11 | 10 | 1 | 0.3 | 0 | — |
| Exp-40 | 4 | 30 | 12 | 12 | 11 | 11 | 1.1 | 0.4 | 0 | — |
| Exp-41 | 4 | 30 | 12 | 11 | 11 | 11 | 1 | 0.4 | 0 | — |
| Exp-42 | 4 | 30 | 12 | 11 | 11 | 10 | 1.4 | 0.4 | 0 | — |
| Exp-43 | 4 | 30 | 12 | 11 | 11 | 11 | 1.2 | 0.4 | 0 | — |
| Exp-44 | 4 | 30 | 12 | 12 | 11 | 11 | 1.1 | 0.4 | 0 | — |
| Exp-45 | 4 | 30 | 11 | 11 | 10 | 10 | 1.2 | 0.5 | 0 | — |
| Exp-46 | 4 | 30 | 11 | 11 | 10 | 10 | 1.0 | 0.5 | 0 | — |
| Exp-47 | 4 | 30 | 11 | 10 | 10 | 9 | 0.9 | 0.5 | 0 | — |
| Exp-48 | 4 | 30 | 12 | 11 | 11 | 101 | 1.1 | 0.4 | 0 | — |
| Exp-49 | 4 | 30 | 12 | 12 | 11 | 11 | 1.3 | 0.6 | 0 | — |
| Exp-50 | 4 | 30 | 11 | 11 | 10 | 10 | 1.2 | 0.5 | 0 | — |
| Exp-51 | 4 | 30 | 11 | 10 | 10 | 9 | 1.1 | 0.5 | 0 | — |
| Exp-52 | 4 | 30 | 11 | 11 | 10 | 10 | 1.0 | 0.5 | 0 | — |
| Exp-53 | 4 | 30 | 11 | 11 | 10 | 10 | 0.9 | 0.5 | 0 | — |
| Exp-54 | 4 | 30 | 12 | 12 | 11 | 10 | 1.2 | 0.4 | 0 | — |
| Exp-55 | 4 | 30 | 12 | 11 | 11 | 10 | 1.3 | 0.5 | 0 | — |
| Exp-56 | 4 | 30 | 12 | 11 | 11 | 10 | 1 | 0.4 | 0 | — |

TABLE 1-continued

Hand wash performance result

| Detergent Sample's name | Detergent dosage, gpl | Washing time, min | Foam height during washing, cm, after | | | | Foam height after $1^{st}$ rinse, cm | Foam height after $2^{nd}$ rinse, cm | Foam height after $3^{rd}$ rinse, cm | Foam height after $4^{th}$ rinse, cm |
|---|---|---|---|---|---|---|---|---|---|---|
| | | | 0 min | 10 min | 20 min | 30 min | | | | |
| Exp-57 | 4 | 30 | 12 | 11 | 10 | 10 | 1.1 | 0.5 | 0 | — |
| Exp-58 | 4 | 30 | 11 | 11 | 10 | 10 | 1.0 | 0.6 | 0 | — |
| Exp-59 | 4 | 30 | 11 | 11 | 10 | 9 | 0.9 | 0.4 | 0 | — |
| Exp-60 | 4 | 30 | 12 | 12 | 11 | 11 | 1.1 | 0.5 | 0 | — |
| Exp-61 | 4 | 30 | 12 | 12 | 11 | 10 | 1.4 | 0.5 | 0 | — |
| Exp-62 | 4 | 30 | 12 | 12 | 11 | 11 | 1.2 | 0.5 | 0 | — |
| Exp-63 | 4 | 30 | 12 | 11 | 11 | 9 | 1.2 | 0.5 | 0 | — |
| Exp-64 | 4 | 30 | 11 | 11 | 10 | 9 | 1.3 | 0.6 | 0 | — |
| Exp-65 | 4 | 30 | 11 | 10 | 10 | 9 | 1.1 | 0.5 | 0 | — |
| Exp-66 | 4 | 30 | 12 | 11 | 11 | 10 | 1.4 | 0.4 | 0 | — |
| Exp-67 | 4 | 30 | 11 | 10 | 10 | 9 | 1 | 0.4 | 0 | — |
| Exp-68 | 4 | 30 | 12 | 11 | 11 | 10 | 1.2 | 0.5 | 0 | — |
| Exp-69 | 4 | 30 | 12 | 11 | 10 | 9 | 1.1 | 0.5 | 0 | — |
| Exp-70 | 4 | 30 | 12 | 11 | 10 | 10 | 1.2 | 0.4 | 0 | — |
| Exp-71 | 4 | 30 | 11 | 11 | 10 | 9 | 1.1 | 0.4 | 0 | — |
| Exp-72 | 4 | 30 | 12 | 11 | 11 | 10 | 1 | 0.5 | 0 | — |
| Exp-73 | 4 | 30 | 11 | 11 | 10 | 10 | 1.5 | 0.6 | 0 | — |
| Exp-74 | 4 | 30 | 11 | 11 | 10 | 9 | 1.4 | 0.5 | 0 | — |
| Exp-75 | 4 | 30 | 12 | 11 | 11 | 10 | 1.5 | 0.4 | 0 | — |
| Exp-76 | 4 | 30 | 12 | 11 | 10 | 9 | 1.1 | 0.4 | 0 | — |
| Exp-7 | 4 | 30 | 11 | 11 | 10 | 9 | 1.2 | 0.5 | 0 | — |
| Exp-78 | 4 | 30 | 11 | 11 | 10 | 10 | 1 | 0.3 | 0 | — |
| Exp-79 | 4 | 30 | 11 | 10 | 10 | 9 | 1.3 | 0.5 | 0 | — |
| Exp-80 | 4 | 30 | 11 | 10 | 10 | 9 | 1.1 | 0.4 | 0 | — |
| Exp-81 | 4 | 30 | 14 | 13 | 13 | 12 | 0.5 | 0 | — | — |
| Exp-82 | 4 | 30 | 8 | 6 | 6 | 5 | 1 | 0.5 | 0.3 | 0 |
| Exp-83 | 4 | 30 | 7 | 7 | 6 | 5 | 1.4 | 0.7 | 0.3 | 0 |
| Exp-84 | 4 | 30 | 7 | 6 | 5 | 4 | 1.5 | 0.8 | 0.5 | 0.3 |
| Exp-85 | 4 | 30 | 7 | 6 | 6 | 5 | 1.4 | 0.7 | 0.3 | 0 |
| Exp-86 | 4 | 30 | 7 | 5 | 5 | 4 | 1.5 | 0.8 | 0.6 | 0.3 |
| Exp-87 | 4 | 30 | 12 | 11 | 11 | 10 | 1.0 | 0.4 | 0 | — |
| Exp-88 | 4 | 30 | 8 | 7 | 6 | 6 | 1 | 0.5 | 0.3 | 0 |
| Exp-V | 4 | 30 | 10.5 | 10.5 | 10 | 9 | 2 | 1.5 | 1 | 0.5 |

TABLE 2

Machine wash performance results

| Detergent Sample's name | Detergent dosage, gpl | Washing time, min | Foam height after 30 min washing in cm | Foam height after $1^{st}$ rinse, cm | Foam height after $2^{nd}$ rinse, cm | Foam height after $3^{rd}$ rinse, cm | Foam height after $4^{th}$ rinse, cm |
|---|---|---|---|---|---|---|---|
| Blank | 4 | 30 | 11 | 2 | 1.6 | 1.0 | 0.8 |
| Exp 1 | 4 | 30 | 13 | 0.8 | 0.2 | 0 | — |
| Exp 2 | 4 | 30 | 12 | 0.8 | 0.3 | 0 | — |
| Exp 3 | 4 | 30 | 12 | 0.9 | 0.3 | 0 | — |
| Exp 21 | 4 | 30 | 11 | 0.8 | 0.3 | 0 | — |
| Exp 22 | 4 | 30 | 11 | 0.7 | 0.2 | 0 | — |
| Exp 23 | 4 | 30 | 12 | 0.9 | 0.3 | 0 | — |
| Exp 41 | 4 | 30 | 12 | 0.9 | 0.3 | 0 | — |
| Exp 42 | 4 | 30 | 11 | 0.8 | 0.2 | 0 | — |
| Exp 43 | 4 | 30 | 12 | 1 | 0.4 | 0 | — |
| Exp 81 | 4 | 30 | 14 | 0.7 | 0.2 | 0 | — |
| Exp 82 | 4 | 30 | 9 | 1.2 | 0.8 | 0.4 | 0.1 |
| Exp 83 | 4 | 30 | 8 | 1.4 | 1 | 0.6 | 0.2 |
| Exp 84 | 4 | 30 | 8 | 1.4 | 0.8 | 0.5 | 0.2 |
| Exp 85 | 4 | 30 | 8 | 1.3 | 0.7 | 0.4 | 0.2 |
| Exp 86 | 4 | 30 | 8 | 1.2 | 0.6 | 0.3 | 0 |
| Exp 87 | 4 | 30 | 12 | 1 | 0.5 | 0 | — |
| Exp 88 | 4 | 30 | 9 | 1.2 | 0.6 | 0.3 | 0 |
| Exp-VIII | 4 | 30 | 11 | 2 | 1.6 | 1.0 | 0.8 |

Above Table 1 and 2 shows the application result of the detergent produced that contains 1.0% of the delay antifoam composition of the present invention (Examples 1-88 with a water soluble carrier and Example V and VIII on a water insoluble carrier) comprising amino silicone antifoam fluid of Formula I with selective alkyl groups R and $R^2$ on the main siloxane chain of the fluid of the type R being a monovalent $C_1$- to $C_6$-alkyl radical and $R^2$ is a monovalent $C_2$- to $C_6$-alkyl radical, in combination with water soluble carrier filler, achieved no drop in foam in washing stage either in performance test in hand washing or machine washing whereas amino oil having both alkyl groups $C_1$ or one of the alkyl group higher than $C_6$ (In Examples 1-88 with a water soluble carrier specifically Examples 84, 85) clearly showed drop in foam height (means generating less foam during washing) in the performance test even at wide range of amine value. Same negative effect of reduction of foam height or less amount of foam is also observed when amino oil synthesized as per patent no DE102012210211A1 (example 86) and EP0685250A1 (example 83) where polymers backbone is methyl methyl groups (both alkyl group is $C_1$ in amino silicone).

Above Table 1 and 2 also shows the application results for the detergent produced containing water insoluble carrier filler by using fluid of Example 1, wherein Example V under Table 1 for hand was formulations clearly show that though the foam height retains a 9 cm height comparable to blank that is acceptable at the washing stage, the foam height during rinsing does not quench or destroys the desired observed anti-foaming property of the fluid when present in combination with water insoluble carrier. Further for the machine wash formulations under Table 2 as evident from the tabulated result for Ex-VIII that when the water insoluble filler was present in combination with the antifoam fluid of the present invention the desired anti-foaming effect was lost which otherwise showed a superior effect when present in selective combination with water soluble carrier filler.

The antifoam compound of prior arts of EP 0685250A1 & DE102012210211A1 clearly reveals low foam during washing in compare to blank detergent (i.e. without silicone defoamer) that is completely undesired of good delayed defoaming composition that causes suppression of the foam during the washing stage.

Thus, by selectively employing the amino fluid of Formula I of the present invention and having selective alkyl groups disposed on the Si atom of the main siloxane chain in combination with a water soluble carrier filler, it is surprisingly found to not only show no' suppression of foam during washing stage, but also all foam removal in rinsing stage in just two rinse cycles making the rinsing stage much faster (detergent Exp. 1 to 81, 87 under Tables 1 and 2 above) as compared to the detergent made with amino silicone antifoam fluid made with alkyl groups and carrier fillers (detergent Exp. 82 to 86 and 88, Examples V and VIII under Tables 1 and 2 respectively) of the presently available state of art of antifoams presently in use. This faster rinsing according to present invention not only saves a huge amount of clean water but also total laundry time also reduced significantly.

It is thus possible by way of the present invention to provide for detergent formulations and the like to favour both washing and rinsing cycles and make washing of clothes/fabrics more convenient and user friendly apart from taking care of avoiding unnecessary wastage of valuable water and saving the environment from unnecessarily wastage of water in hand wash and/or machine washing and the like.

I claim:

1. A delayed antifoam composition comprising:
  (i) 1 to 35% by weight of an amino silicone antifoam fluid, of the formula

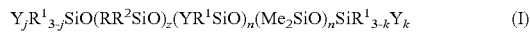  (I)

where
  Y is an amino group of the general formula,

  (II)

or the protonated or acylated amino forms of the amino group Y,
  $R^1$ is the same or different and is a monovalent $C_1$- to $C_6$-alkyl radical or a $C_1$- to $C_6$-alkoxy radical or a hydroxyl radical,
  R is a monovalent $C_1$- to $C_6$-alkyl radical,
  $R^2$ is a monovalent $C_2$- to $C_6$-alkyl radical,
  j is an integer from 0 to 3,
  k is an integer from 0 to 3,
  z is a an integer from 1 to 500,
  n is an integer from 1 to 70,
  m is an integer from 1 to 10,
  v is an integer from 0 to 15,
  x is an integer from 0 to 1,
  $R^3$ is a $C_1$-$C_{10}$-alkylene radical,
  $R^4$ is hydrogen or a $C_1$-$C_4$-alkyl radical,
  $R^5$ and $R^6$ independently represent hydrogen or a $C_1$-$C_4$-alkyl radical; and
  (ii) 65 to 99% by weight of a water soluble carrier filler selected from the group consisting of sodium carbonate, sodium sulphate, potassium carbonate, potassium sulphate, sodium bicarbonate, potassium bicarbonate, water soluble starch and its mixtures thereof.

2. The composition of claim 1, wherein the amine value of the amino silicone antifoam fluid is from 30 to 200 of KOH/gm sample.

3. The composition of claim 1, wherein R is $C_1$- to $C_6$-alkyl radical is selected from the group consisting of methyl, ethyl, n-propyl, isopropyl, 1-n-butyl, isobutyl, tert-butyl, n-pentyl, isopentyl, neopentyl and tert-pentyl, n-hexyl, isomers of hexyl radical such as 2-methyl pentyl, 3-methyl pentyl, 2,2-dimethyl butyl, 2,3-dimethyl butyl radical and mixtures thereof.

4. The composition of claim 1, wherein $R^2$ is $C_2$- to $C_6$-alkyl radical is selected from the group consisting of ethyl, n-propyl, isopropyl, 1-n-butyl, 2-n-butyl, isobutyl, tert-butyl, n-pentyl, isopentyl, neopentyl and tert-pentyl radical, n-hexyl, isomers of hexyl radical such as 2-methyl pentyl, 3-methyl pentyl, 2,2-dimethyl butyl, 2,3-dimethyl butyl and mixtures thereof.

5. The composition of claim 1, wherein the amino radical Y is selected from the group consisting of —$(CH_2)_3NH_2$, —$(CH_2)_3NH(CH_2)_2NH_2$, —$(CH_2)_3NHC_6H_{11}$, —$(CH_2)_3NH(CH_2)_2NHC_6H_{11}$, —$(CH(CH_3)CH_2CH_2)NH_2$, —$(CH(CH_3)CH_2CH_2)NH(CH_2)_2NH_2$, —$(CH_2)NH_2$; —$(CH_2)NH(CH_2)_2NH_2$, —$(CH(CH_3)CH_2CH_2)NHC_6H_{11}$, —$(CH(CH_3)CH_2CH_2)NH(CH_2)_2NHC_6H_{11}$, —$CH_2NHC_6H_{11}$, —$CH_2NH(CH_2)_2NHC_6H_1$ and its protonated or acylated form or its mixtures thereof.

6. The composition of claim 5, wherein the amino radical Y is selected from the group consisting of —$(CH_2)_3NH_2$, —$(CH_2)_3NH(CH_2)_2NH_2$ and its protonated or acylated form or its mixtures thereof.

7. A process for preparation of the composition of claim 1 comprising the steps of:
  a. polymerizing trialkylsiloxy terminated polydialkylsiloxane of formula $R_3SiO$—$(RR^2SiO)_p$—$SiR_3$, where R a monovalent $C_1$- to $C_6$-alkyl radical, $R^2$ is a monovalent $C_2$- to $C_6$-alkyl radical, and p is an integer from 1 to 500, and an amino silane or a hydrolysate of amino silane of formula $YSiR^1(OR^{11})_2$, where $R^{11}$ is a $C_1$-$C_4$-alkyl radical, Y is an amino group of the general formula (II), $R^1$ is the same or different and is a monovalent $C_1$- to $C_6$-alkyl radical or a $C_1$- to $C_6$-alkoxy radical or a hydroxyl radical, to form the amino silicone antifoam fluid of formula (I);

b. mixing the antifoam amino silicone antifoam fluid with a water soluble carrier filler selected from the group consisting of sodium carbonate, sodium sulphate, potassium carbonate, potassium sulphate, sodium bicarbonate, potassium bicarbonate and water soluble starch to form the composition.

8. A laundry detergent composition for machine or hand washing in powder form comprising:
0.5 to 5% by weight of an antifoam powder of the total amount of the laundry detergent composition comprising:
(i) 1 to 35% by weight of an amino silicone antifoam fluid, of the formula $$Y_jR^1{}_{3-j}SiO(RR^2SiO)_z(YR^1SiO)_n(Me_2SiO)_vSiR^1{}_{3-k}Y_k \quad (1)$$

where
Y is an amino group of the general formula, $$-R^3-[NR^4-(CH_2)_m-]_xNR^5R^6 \quad (II)$$

or the protonated or acylated amino forms of the amino group Y,
$R^1$ is the same or different and is a monovalent $C_1$- to $C_6$-alkyl radical or a $C_1$- to $C_6$-alkoxy radical or a hydroxyl radical,
R is a monovalent $C_1$- to $C_6$-alkyl radical,
$R^2$ is a monovalent $C_2$- to $C_6$-alkyl radical,
j is an integer from 0 to 3,
k is an integer from 0 to 3,
z is a an integer from 1 to 500, n is an integer from 1 to 70,
m is an integer from 1 to 10,
v is an integer from 0 to 15,
x is an integer from 0 to 1,
$R^3$ is a $C_1$-$C_{10}$-alkylene radical,
$R^4$ is hydrogen or a $C_1$-$C_4$-alkyl radical,
$R^5$ and $R^6$ independently represent hydrogen or a $C_1$-$C_4$-alkyl radical; and
(ii) 65 to 99% by weight of a water soluble carrier filler selected from the group consisting of sodium carbonate, sodium sulphate, potassium carbonate, potassium sulphate, sodium bicarbonate, potassium bicarbonate and water soluble starch and mixtures thereof; and
(iii) 95 to 99.5% by weight of common hand wash laundry detergent ingredients.

\* \* \* \* \*